(12) United States Patent
Yokoyama

(10) Patent No.: US 8,729,371 B2
(45) Date of Patent: May 20, 2014

(54) STRINGED INSTRUMENT, MANUFACTURING METHOD AND APPARATUS THEREOF

(75) Inventor: Yukio Yokoyama, Tokyo (JP)

(73) Assignee: Tokyo Metropolitan Industrial Technology Research Institute (JP)

( * ) Notice: Subject to any disclaimer, the term of this patent is extended or adjusted under 35 U.S.C. 154(b) by 263 days.

(21) Appl. No.: 13/061,905

(22) PCT Filed: Aug. 31, 2009

(86) PCT No.: PCT/JP2009/065214
§ 371 (c)(1),
(2), (4) Date: Mar. 2, 2011

(87) PCT Pub. No.: WO2010/026951
PCT Pub. Date: Mar. 11, 2010

(65) Prior Publication Data
US 2011/0162506 A1 Jul. 7, 2011

(30) Foreign Application Priority Data
Sep. 2, 2008 (JP) ................................. 2008-224364

(51) Int. Cl.
*G10D 1/00* (2006.01)
(52) U.S. Cl.
USPC ........................................................... 84/173
(58) Field of Classification Search
USPC ........................................................... 84/173
See application file for complete search history.

(56) References Cited

U.S. PATENT DOCUMENTS

| 5,465,642 | A | 11/1995 | Gotoh |
| 5,811,703 | A | 9/1998 | Hoshino |
| 6,811,744 | B2 * | 11/2004 | Keicher et al. ..................... 419/5 |
| 7,282,630 | B2 * | 10/2007 | Van Vliet ......................... 84/291 |
| 7,999,162 | B2 * | 8/2011 | Izutani et al. ...................... 84/25 |
| 2003/0000365 | A1 | 1/2003 | Hirayama et al. |
| 2006/0060063 | A1 * | 3/2006 | Van Vliet ..................... 84/452 R |
| 2006/0070507 | A1 | 4/2006 | Nevanen et al. |
| 2008/0110318 | A1 * | 5/2008 | Fox ................................. 84/267 |

FOREIGN PATENT DOCUMENTS

| JP | Showa 60-54187 | U1 | 4/1985 |
| JP | Heisei 7-199908 | | 8/1995 |
| JP | Heisei 10-124058 | A | 5/1998 |
| JP | Heisei 10-211659 | A | 8/1998 |
| JP | Heisei 15-015632 | A | 1/2003 |
| JP | Heisei 16-069928 | A | 3/2004 |
| JP | Heisei 18-502429 | A | 1/2006 |

* cited by examiner

*Primary Examiner* — Jianchun Qin
(74) *Attorney, Agent, or Firm* — Bruzga & Associates; Charles E. Bruzga; Jay S. Pattumudi

(57) ABSTRACT

The present invention provides a stringed instrument capable of corresponding to a preference of a player of the stringed instrument, a purpose of performance, and so on as much as possible. A resonance box portion fabricated by an additive fabrication method and a neck portion protruding from the resonance box portion are included, and material constants at a desired area of the resonance box portion is made different from material constants at an adjacent area adjacent to the desired area step by step or continuously. Vibrational characteristics of the instrument are changed by the partial difference of the material constants, and thereby, the stringed instrument capable of corresponding to the preference of the player, the purpose of the performance, and so on is provided.

20 Claims, 14 Drawing Sheets

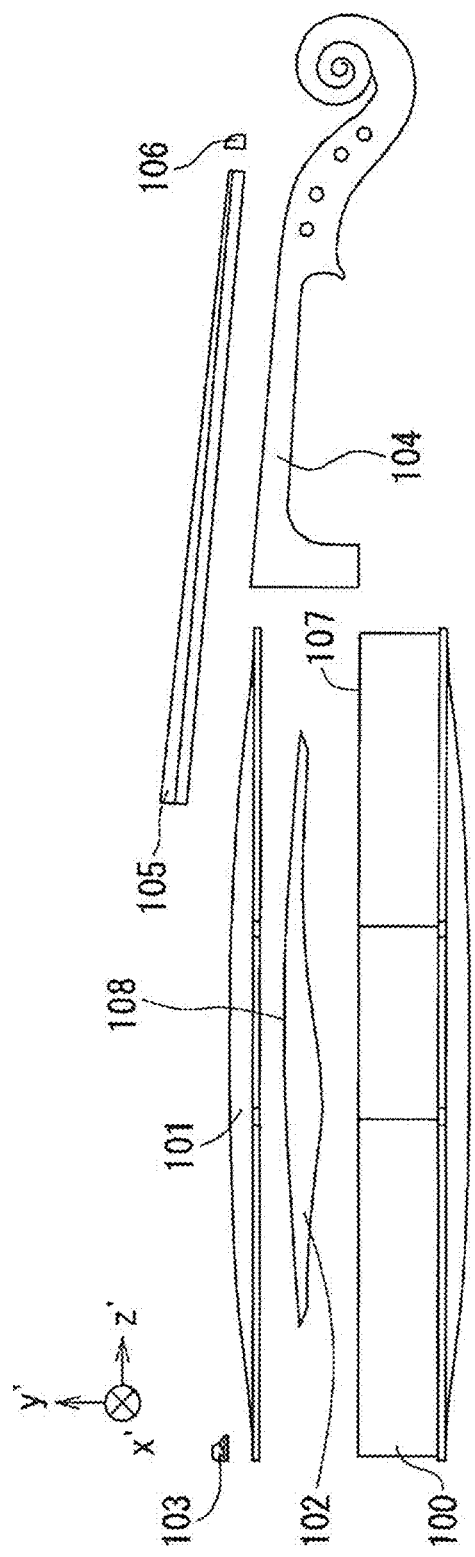

FIG. 4(a)
FIG. 4(b)
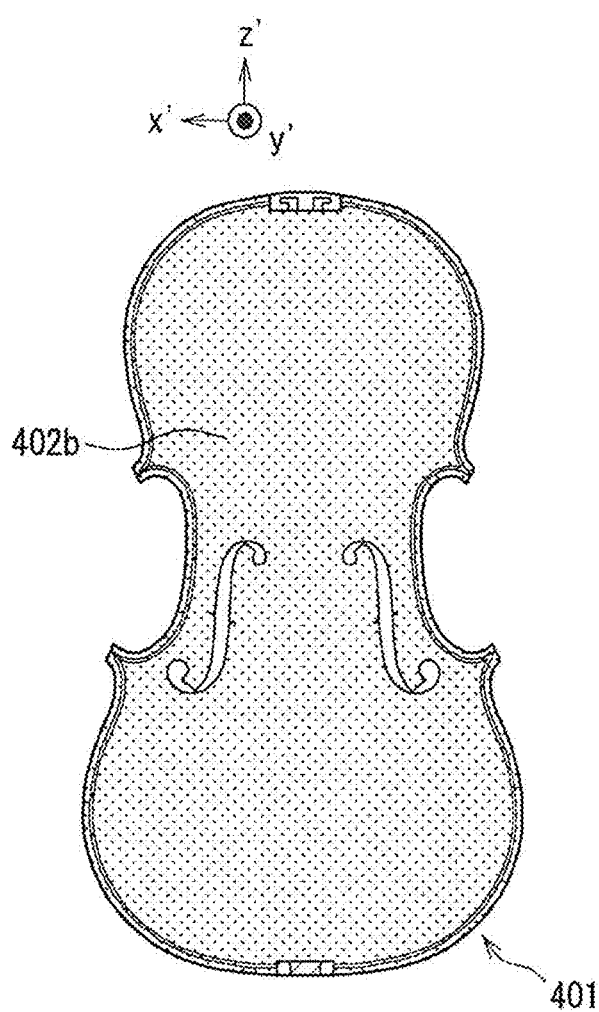
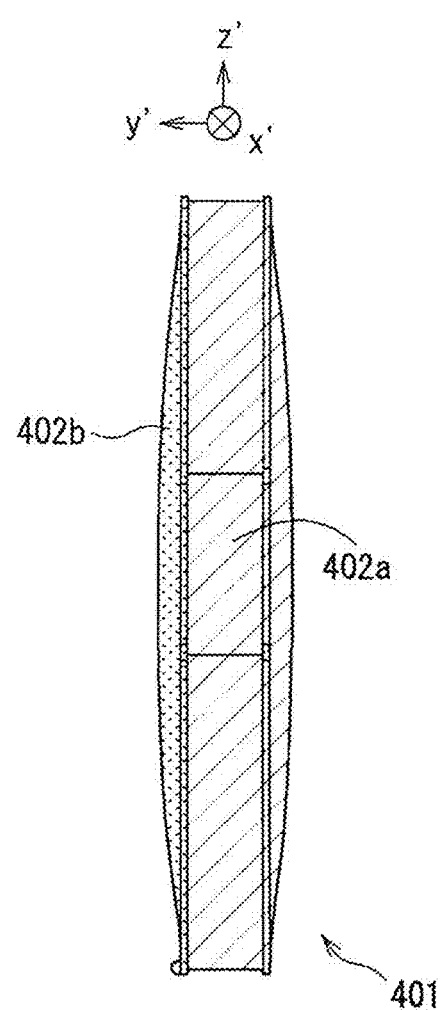

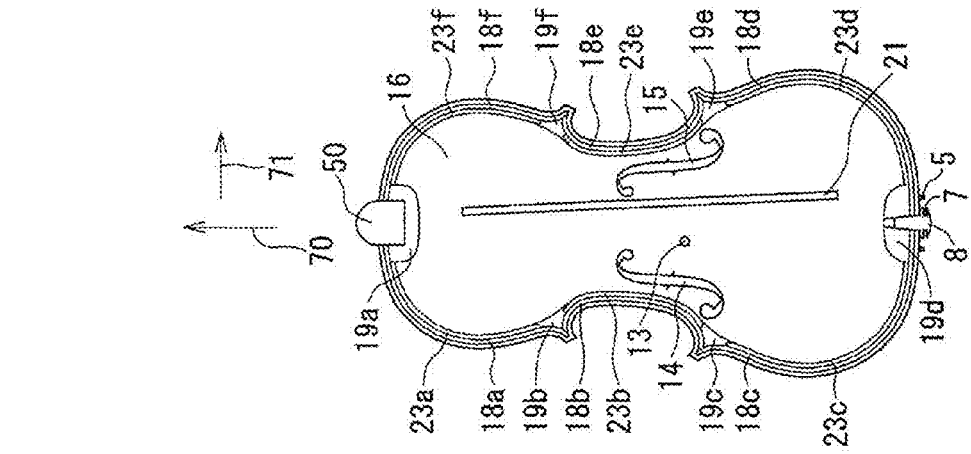
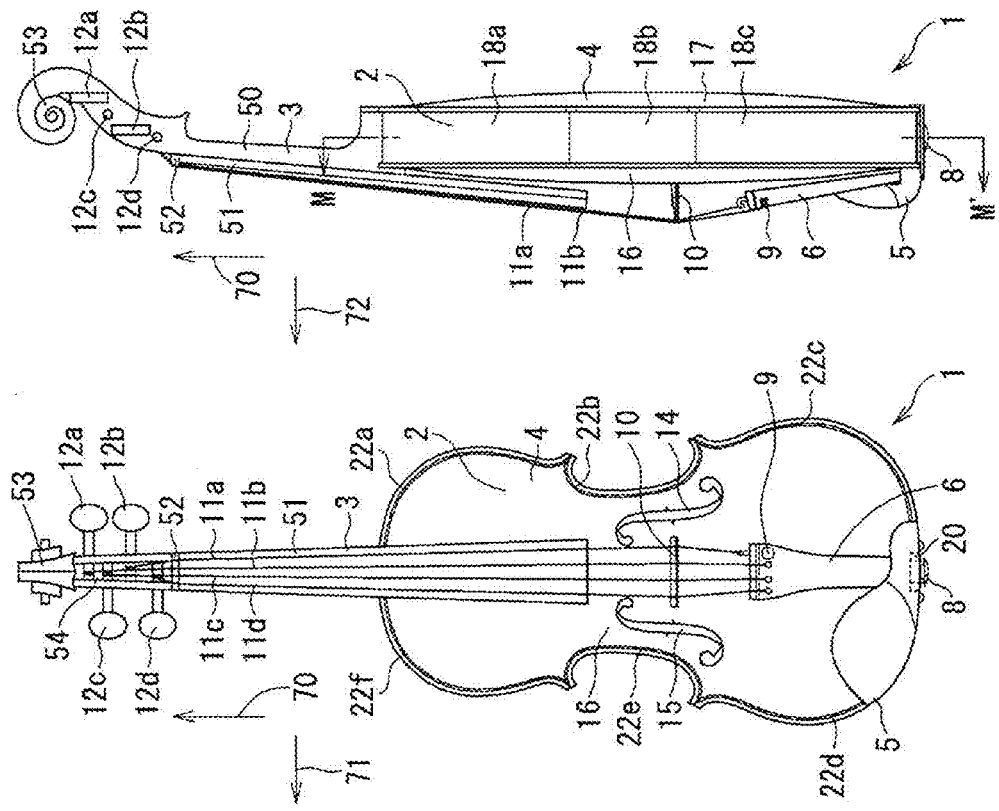

STRINGED INSTRUMENT, MANUFACTURING METHOD AND APPARATUS THEREOF

CROSS REFERENCE TO RELATED APPLICATIONS

This application is a United States Application under 35 U.S.C. 371 claiming benefit of PCT Application No. PCT/JP2009/065214, filed on Aug. 31, 2009, which claims the benefit of Japanese Patent Application No. 2008-224364, filed on Sep. 2, 2008, the contents of each of which are incorporated herein by reference.

BACKGROUND OF THE INVENTION

1. Field of the Invention

The present invention relates to a stringed instrument, a manufacturing method of the stringed instrument, and a stringed instrument manufacturing apparatus.

2. Description of the Related Art

FIGS. 13(a) to 13(c) are structural drawings of a violin as an example of stringed instruments of the present invention. FIG. 13(a) is a front view of the violin, FIG. 13(b) is a right side view of the violin, and FIG. 13(c) is an M-M' sectional view of the violin illustrated in FIG. 13(b). An arrow 70 defining a longitudinal direction of the violin, an arrow 71 defining a width direction of the violin, and an arrow 72 defining a thickness direction of the violin are drawn in each of FIGS. 13(a), 13(b), 13(c) to simplify the explanation.

In the present description, detailed names of respective portions of the violin are referred to later-described non-patent documents 1, 2, 3, 4. A whole of a violin 1 in FIGS. 13(a) to 13(c) is constituted by an instrument main body 4 and a group of equipped members. The instrument main body 4 is generally constituted by a resonance box portion 2 and a neck portion 3. The group of equipped members is generally constituted by a chin rest 5, a tail-piece 6, a tail-gut 7, an endpin 8, an adjuster 9, a bridge 10, strings 11a, 11b, 11c, 11d, pegs 12a, 12b, 12c, 12d, and a sound post 13, which are equipped at respective places of the instrument main body 4. The resonance box portion 2 is integrally fabricated to include a top plate portion 16 in which two "f" holes 14, 15 are opened, a back plate portion 17, side plate portions 18a, 18b, 18c, 18d, 18e, 18f arranged between the top plate portion 16 and the back plate portion 17, blocks 19a, 19b, 19c, 19d, 19e, 19f, a saddle 20 represented by a dotted line (a hidden line), a bass bar 21, purflings 22a, 22b, 22c, 22d, 22e, 22f, and linings 23a, 23b, 23c, 23d, 23e, 23f. There is a case when the block 19a is called as an upper block, the block 19d is called as a lower block, and the other blocks 19b, 19c, 19e, 19f are called as corner blocks among the blocks 19a, 19b, 19c, 19d, 19e, 19f. The neck portion 3 is constituted to include a neck 50, a fingerboard 51, a nut 52, a scroll 53, and a pegbox 54 in which eight holes to mount the pegs 12a, 12b, 12c, 12d are bored. Note that names such as the neck portion, the resonance box portion, the instrument main body in the present description are defined by the present inventor to simplify an explanation of the present invention. The present invention relates to stringed instruments (acoustic violin and so on) including a violin family (a generic name of violin, viola, cello, contrabass) sounding by using an effect and so on of resonance of sound. Instruments such as a guitar, an ukulele in a type plucking the strings with fingers, a pick, or the like are included in the stringed instruments described in the present description, but the following explanation is made centering on the violin being a typical example of the violin family.

Conventionally, the instrument main body of the violin, particularly the resonance box portion is manufactured by adhering woods cut in approximately predetermined shapes by using adhesive (glue, wood bond, and so on). Basic structures of the stringed instruments other than the violin belonging to the violin family, namely, the viola, the cello, the contrabass are approximately the same as the basic structure of the violin illustrated in FIGS. 13(a) to 13(c). One of major differences when the violin, the viola, the cello, and the contrabass in standard sizes are compared respectively is a size of a dimension.

Besides, an example manufacturing a body structure of a stringed instrument (electric guitar) by an additive fabrication method is disclosed in later-described Patent Document 1. The above-stated stringed instruments disclosed in Patent Document 1 (hereinafter, called as a "conventional stringed instrument") includes a resonance body structure having the structure of the additive fabrication method while regarding the structure as an annual ring. An example in which an instrument is manufactured by laminating and baking plural thin ceramic plates is disclosed in later-described Patent Document 2 though it is different from a generally known additive fabrication method. In the additive fabrication method in which a three-dimensional structure is formed by a laser sintering of which raw material is powder, an additive fabrication method securing fabrication accuracy desired for the three-dimensional structure manufactured by using plural laser irradiation conditions, and enabling to provide enough strength for the three-dimensional structure is disclosed in later-described Patent Document 3. A detailed structure, names of respective portions of instruments, and a manufacturing method of a conventional wooden violin are to be referred to the later-described non-patent documents 1, 2, 3, 4. A general consideration as for the additive fabrication method is to be referred to the later-described non-patent documents 5, 6, 7, and so on.

Patent Document 1: Japanese Patent Public disclosure No. 2004-69928 (refer to paragraphs 0007, 0008 and FIG. 2)

Patent Document 2: Japanese Patent Public disclosure No. 1985-158489

Patent Document 3: Japanese Patent Public disclosure No. 2003-321704

Non-Patent Document 1: "New Technology Series: Violin Making" written by Shoichiro Kawakami, Bijutsu Shuppan. Co., Ltd., Aug. 10, 1992, Second impression Non-Patent Document 2, "Violin making as it was and is: First part" written by Heron Allen, translated by Remona Oku, Bunkyo Gakki Co., Ltd., Planning Section, July, 1992, Fourth edition Non-Patent Document 3: "Violin making as it was and is: Second part" written by Heron Allen, translated by Remona Oku, Bunkyo Gakki Co., Ltd., Planning Section, February, 1998, Third edition.

Non-Patent Document 4: "Violin making as it was and is: Third part" written by Heron Allen, translated by Remona Oku, Bunkyo Gakki Co., Ltd., Planning Section, October, 1995, First edition Non-Patent Document 5: "Three-dimensional CAD Practical Utilization", edited by Japan Society for Design Engineering, Corona Co., Ltd., First edition, First impression, 2006. 8. 28, pp. 178-190

Non-Patent Document 6: "Rapid Prototyping, Rapid Tooling", written by Masato Imamura, Journal of the Japan Society of Mechanical Engineers, Vol. 109, No. 1054, 2006. 9, pp. 742-743

Non-Patent Document 7: "Special Issue: Advanced Product Design to using Rapid Prototyping Technology", Journal of Japan Society for Design Engineering, Vol. 41, No. 12, 2006. 12, pp. 601-629

Non-Patent Document 8: "Aria eighty years old" written by Hideo Itokawa, Nesuko, Jul. 5, 1992, First volume Here, a subject is returned to the conventional stringed instrument. As stated above, the conventional stringed instrument is manufactured by the additive fabrication method, and has the resonance body structure regarding a lamination structure thereof as an annual ring. However, sound of the stringed instrument is not determined only by the annual ring even though the lamination structure of a structure fabricated by the additive fabrication method can be regarded as the annual ring. When materials constituting a resonance body structure are compared between wood and synthetic resin material, vibrational characteristics (for example, natural resonance frequency, vibrational mode, vibrational amplitude) of both must be different because material constants of the both are different even if shapes (annual ring structure) of the both can be constituted similarly. It is impossible to produce acousmato equivalent to the acousmato of the wooden stringed instrument by the conventional stringed instruments even if the annual ring structure thereof can be imitated, as long as there is the difference in the vibrational characteristics. The inventor of the present invention recognized that it is extremely difficult to obtain the same acousmato as the wooden stringed instrument because there is the difference in the vibrational characteristics as stated above even if the stringed instrument having the same shape as the wooden stringed instrument can be manufactured by using a material different from wood (for example, synthetic resin powder). The inventor looked at from a different angle to get an idea that it is necessary to keep an eye on obtaining the acousmato different from the wooden stringed instruments, or the acousmato difficult to be produced by the wooden stringed instrument if the stringed instrument (particularly the resonance box portion) is manufactured by using the additive fabrication method. For example, the inventor hit upon ideas of manufacturing a violin of which sound emitted by the strings of the violin is different from a general sound, and producing a violin of which sound volumes of respective four strings are extremely small, in addition to manufacture a violin structure copying the structure of the wooden stringed instrument. For example, it is cited to make the sound of a first string (E string, the thinnest string) mellower as an example of the former idea. There are many players to make a sound of E (mi in C major) which is played open in case of the first string (E string, the thinnest string) by pressing a high position of a second string which is said to have a sound mellower than the first string by fingers. It is because it is generally thought that the mellower sound can be created by the second string than, the first string if the sound is the same though there are individual differences in sound preferences. If it is possible to approximate the sound of the first string to that of the second string to satisfy the preference of the player, the first string becomes easier to use, and particularly, it is advantageous to a performance beginner. As an example of the latter idea, it is possible to practice without paying any attention to circumstances if the sound volume created from each of the four strings is extremely small, and therefore, it is very convenient to satisfy purposes of performance such as the performance practice at night and a performance practice performed simultaneously with the other players. A problem to be solved by the present invention exists in providing a stringed instrument capable of corresponding to the preference of the player (user) of the stringed instrument, the purpose of the performance, and so on as much as possible.

SUMMARY OF THE INVENTION

To solve the above-stated problem, the present invention includes the constitution described below, and achieves operation and effect similarly described below according to the constitution. It should be noted that the definition of terms and so on used in the description of the invention of any one of claims are applied also to the inventions described in the other claims within a permissible range irrespective of the order of the description, to description format, category, and so on of the claims as long as possible within a range of characteristics.

(Feature of Invention of Claim 1)

A stringed instrument according to an invention of claim 1 (hereinafter, referred to as a "stringed instrument of claim 1" when appropriate) is a stringed instrument including a resonance box portion fabricated by an additive fabrication method and a neck portion protruding from the resonance box portion. Here, the material constants at a three-dimensional desired area of the resonance box portion is made different from material constants at a three-dimensional adjacent area adjacent to the desired area step by step or continuously. Here, the material constants mean, for example, an elastic stiffness constant or density. They may be used independently or in combination. The resonance box portion fabricated by the additive fabrication method may be either the case when it is integrally fabricated by the same fabrication method or the case when separated members fabricated by the same fabrication method are adhered (bonded) or the like afterwards. The "three-dimensional desired area" and the "three-dimensional adjacent area" described here mean the areas respectively including width and thickness (deepness). Hereinafter, there are cases when these are abbreviated as the "desired area", the "adjacent area".

According to the stringed instrument in claim 1, it is possible to change vibrational characteristics by making the material constants different at the desired area and the adjacent area. The change of the vibrational characteristics leads to, for example, the changes of a sound volume, a sound, a degree of acousmato, further, to a change of a coupling of these elements. These changes enable to provide the stringed instrument satisfying preference of a player, purpose of performance, and so on. To begin with, it is almost impossible to design and manufacture the stringed instrument such that the sound completely consistents with the preference of the player is generated, as same as all of the other instruments. The sound generated from the stringed instrument changes depending on a change over time of constituting materials thereof (for example, drying of wood and coating) and a change in performance circumstances (for example, rise and fall of temperature) if, for example, only the resonance box portion is considered. It is well known that there is a case when the preferred sound can be generated only after the stringed instrument has been used for a long time, and performed fine adjustment. The preferred sound is not an undifferentiated one, and it is different by each player. For example, a sound of a violin played by a soloist is required to be outstanding because of its characteristics, but a violin played by a member of an orchestra is disliked to be outstanding because it is required to be in harmony with peripheral members, though it is only a general consideration. Here, what is important is not to provide the stringed instrument completely satisfying the preference which is different by each player, but to increase an opportunity when the player meets with the stringed instrument satisfying the preference, namely, to make the stringed instrument have variety. It is therefore required to enable to provide the various stringed instruments manufactured to generate various sounds by differences of the vibrational characteristics of the stringed instruments, and the material constants of the stringed instruments are made different to enable the above. The same thing is required to provide the stringed instruments satisfying the purpose of the performance.

(Feature of Invention of Claim 2)

A stringed instrument according to an invention of claim 2 (hereinafter, referred to as a "stringed instrument of claim 2" when appropriate) includes a basic constitution of the stringed instrument of claim 1, and further, the resonance box portion is constituted to include a top plate portion, a back plate portion, and side plate portions arranged between the top plate portion and the back plate portion. The desired area is provided at least at the top plate portion or the back plate portion. The desired area may be provided additionally at the neck portion.

According to the stringed instrument of claim 2, the function and effect of the stringed instrument of claim 1 are generated at least at the top plate portion or the back plate portion, and secondary function and effect have an impact on the whole of the resonance box portion. The top plate portion is in an open state toward a direction getting away from a surface of the top plate portion compared to the other portions of the back plate portion and so on, and therefore, it is the easiest portion to be affected by the received vibration of the strings. For example, in case of a general acoustic guitar, the vibration of the strings gets into the resonance box portion through a hole opening at the top plate portion to resonant, the top plate portion thereby vibrates and makes a large sound, and therefore, the top plate portion is the portion to be most readily affected by the vibration of the strings. In case of a violin, the strings are stretched over a bridge standing on the top plate portion, and therefore, the top plate portion is the portion to be most readily affected by the vibration of the strings. It is therefore possible to make an effect of the change of the material constants between the desired area and the adjacent area given to the whole of the resonance box portion large because the top plate portion is the portion to be readily affected by the strings. On the other hand, the back plate portion is similarly a portion to be readily affected by the string vibration, and therefore, it is possible to make the effect given to the whole of the resonance box portion large as same as the top plate portion.

(Feature of Invention of Claim 3)

A stringed instrument according to an invention of claim 3 (hereinafter, referred to as a "stringed instrument of claim 3" when appropriate) includes the basic constitution of the stringed instrument according to claim 1 or claim 2, and further, the neck portion is integrally fabricated with the resonance box portion by the additive fabrication method.

According to the stringed instrument of claim 3, an assembling required when the neck portion is a separated body is not necessary by integrally fabricating it with the resonance box portion in addition to the function and effect of the stringed instrument of claim 1 or claim 2. Namely, it saves a trouble in manufacturing.

(Feature of Invention of Claim 4)

A stringed instrument according to an invention of claim 4 (hereinafter, referred to as a "stringed instrument of claim 4" when appropriate) includes the basic constitution of the stringed instrument according to claim 1 or claim 2, and further, the neck portion is fabricated by the additive fabrication method as the separated body from the resonance box portion, and it is attached to the resonance box portion via a combination portion formed between the resonance box portion.

According to the stringed instrument of claim 4, it becomes possible to exchange the neck portion when the exchange is required resulting from, for example, a breakage, an abrasion, further a heavy soil because the neck portion and the resonance box portion are fabricated separately, in addition to the function and effect of the stringed instrument of claim 1 or claim 2. The whole of the stringed instrument can be used for a long time by enabling the exchange. A player of any instrument without being limited to the stringed instrument has an attachment to an instrument satisfying his/her preference and wants to use it for a long time. It is very important that the stringed instrument is made possible to use for a long time in the above meaning.

(Feature of Invention of Claim 5)

In a stringed instrument according to an invention of claim 5 (hereinafter, referred to as a "stringed instrument of claim 5" when appropriate), the additive fabrication method used for the manufacturing of the stringed instrument according to any one of claims 1 to 4 is generally the one in which synthetic resin powder is (used as a main raw material) sintered by light irradiation (for example, laser light irradiation). It is not intended to exclude the one in which metallic powder or powder other than the metallic powder is mixed to the synthetic resin powder, the metallic powder, and so on.

According to the stringed instrument of claim 5, the manufacturing of the stringed instruments according to claim 1 to claim 4 is enabled by the synthetic resin powder. When the synthetic resin powder is sintered by the light irradiation, it is possible to change the material constants (sintering conditions) only by changing irradiation conditions of light, and therefore, the change of the material constants can be enabled easily.

(Feature of Invention of Claim 6)

A stringed instrument according to an invention of claim 6 (hereinafter, referred to as a "stringed instrument of claim 6" when appropriate) includes a basic constitution of the stringed instrument according to claim 5, and further, any one or both of the neck portion and the resonance box portion is (are) constituted to include an outside contour portion fabricated by sintering and an enclosed space portion enclosed by the outside contour portion, and unsintered synthetic resin powder is remained inside the enclosed space portion.

According to the stringed instrument of claim 6, vibrational characteristics of any one or both of the neck portion and the resonance box portion change(s) compared to a case when the enclosed space portion does not exist owing to a function of the unsintered synthetic resin powder remaining in the enclosed space portion in addition to the function and effect of the stringed instrument of claim 5. A degree of the change is adjusted, and thereby, it becomes possible to achieve performances (sound volume, acoustic quality, and acousmato) of the stringed instrument of the present invention as an instrument satisfying a preference of a player. Further, a specific gravity of the unsintered synthetic resin powder inside the enclosed space portion is lighter than a specific gravity of the sintered outside contour portion, and therefore, it is possible to reduce a weight of not only the neck portion but also the whole of the stringed instrument for the extent.

(Feature of Invention of Claim 7)

A stringed instrument according to an invention of claim 7 (hereinafter, referred to as a "stringed instrument of claim 7" when appropriate) includes the basic constitution of the stringed instrument according to claim 5, and further, any one or both of the neck portion and the resonance box portion is (are) constituted to include an outside contour portion fabricated by sintering and a space portion surrounded by the outside contour portion, and at least one discharge hole to discharge the unsintered synthetic resin powder remained in the space portion is provided at the outside contour portion. The discharge hole after the unsintered synthetic resin powder is discharged maintains an open state or is closed by a closing member.

According to the stringed instrument of claim 7, the vibrational characteristics of any one or both of the whole of the neck portion and the resonance box portion change(s) compared to a case when the space portion does not exist because the space portion is included in addition to the function and effect of the stringed instrument of claim 5. A degree of the change is adjusted, and thereby, it is possible to achieve the performances (sound volume, acoustic quality, and acousmato) of the stringed instrument of the present invention as the instrument satisfying the preference of the player. Further, it is possible to reduce a weight of not only the neck portion but also the whole of the stringed instrument for the extent because the space portion is included. The synthetic resin powder remained inside the space portion at the fabrication time is discharged outside via the discharge hole. Discharging methods such as a gravity fall, suction from external, further injection of compressed, air, can be cited as examples. When the closing member is used, the space portion is enclosed by the closure.

(Feature of Invention of Claim 8)

In a stringed instrument according to an invention of claim 8 (hereinafter, referred to as a "stringed instrument of claim 8" when appropriate), the additive fabrication method in which a liquid state raw material is solidified by light irradiation (for example, ultraviolet ray irradiation) is used as the additive fabrication method used for the manufacturing of the stringed instrument according to any one of claims 1 to 4.

According to the stringed instrument of claim 8, the manufacturing of the stringed instruments of claims 1 to 4 is enabled by the liquid state raw material. When plural liquid state raw materials roughly mixed are solidified by the light irradiation, it is possible to change the material constants by changing a general mixture ratio of the plural liquid state raw materials, and therefore, it is possible to easily enable the change of the material constants.

(Feature of Invention of Claim 9)

A stringed instrument according to an invention of claim 9 (hereinafter, referred to as a "stringed instrument of claim 9" when appropriate) includes a basic constitution of the stringed instrument according to claim 8, and further, any one or both of the neck portion and the resonance box portion is (are) constituted to include an outside contour portion fabricated by solidification and an enclosed space portion enclosed by the outside contour portion, and a support which is fabricated by solidification to support the solidification fabrication when the outside contour portion is fabricated by solidification is remained inside the enclosed space portion.

According to the stringed instrument of claim 9, the vibrational characteristics of any one or both of the neck portion and the resonance box portion change(s) compared to a case when the enclosed space portion does not exist owing to the function of the support remaining in the enclosed space portion in addition to the function and effect of the stringed instrument of claim 8. A degree of the change is adjusted, and thereby, it is possible to achieve the performances (sound volume, acoustic quality, and acousmato) of the stringed instrument of the present invention as the instrument satisfying the preference of the player.

(Feature of Invention of Claim 10)

A stringed instrument according to an invention of claim 10 (hereinafter, referred to as a "stringed instrument of claim 10" when appropriate) includes the basic constitution of the stringed instrument according to claim 8, and further, any one or both of the neck portion and the resonance box portion is (are) constituted to include an outside contour portion fabricated by solidification and a space portion surrounded by the outside contour portion, and at least one discharge hole to discharge the support to support the solidification fabrication of the outside contour portion remained in the space portion is provided at the outside contour portion, and the discharge hole after the support is discharged maintains the open state or is closed by the closing member.

According to the stringed instrument of claim 10, the vibrational characteristics of any one or both of the whole of the neck portion and the resonance box portion change(s) compared to a case when the space portion does not exist because the space portion is included in addition to the function and effect of the stringed instrument of claim 8. A degree of the change is adjusted, and thereby, it becomes possible to achieve the performance (sound volume, acoustic quality, and acousmato) of the stringed instrument of the present invention as the instrument satisfying the preference of the player. Further, it is possible to reduce a weight of not only the neck portion but also the whole of the stringed instrument for the extent because the space portion is included. The support remained inside the space portion at the fabrication time is discharged outside via the discharge hole. Discharging methods such as washing by means of water and so on, blowing-out removal by means of water-jet, or scraping out or scraping off by a tool in wiriness, and so on can be cited as examples. When the closing member is used, the space portion is enclosed by the closure.

(Feature of Invention of Claim 11)

A stringed instrument according to an invention of claim 11 (hereinafter, referred to as a "stringed instrument of claim 11" when appropriate) includes the basic constitution of the stringed instrument according to any one of claims 3 to 10, and further, the neck portion is reinforced by a reinforcing member toward a longitudinal direction at inside or outside thereof, or at inside and outside thereof.

According to the stringed instrument of claim 11, the neck portion is reinforced by a function of the reinforcing member in addition to the function and effect of the stringed instrument of any one of claims 3 to 10. In particular, a deformation or a breakage of a fingerboard resulting from operation of left hand at a normal performance time is prevented. Besides, a tension of the strings is always added to the neck portion, and therefore, the deformation or the breakage of the neck portion resulting from the tension is prevented depending on a disposed position of the reinforcing member.

(Feature of Invention of Claim 12)

A manufacturing method of a stringed instrument according to an invention of claim 12 (hereinafter, referred to as a "manufacturing method of claim 12" when appropriate) is a method to manufacture the stringed instrument including a resonance box portion integrally fabricated by an additive fabrication method and a neck portion protruding from the resonance box portion. This method includes: a resonance box portion fabrication process fabricating the resonance box portion while making material constants at a three-dimensional desired area different from material constants at a three-dimensional adjacent area adjacent to the desired area step-by-step or continuously; a neck portion manufacturing process manufacturing the neck portion in parallel with or before or after the resonance box portion fabrication process;

and a neck portion attaching process attaching the neck portion to the resonance box portion fabricated in the resonance box portion fabrication process.

According to the manufacturing method of claim 12, the resonance box portion constituting the stringed instrument is fabricated by the additive fabrication method, and at this time, the material constants are made different between the desired area and the adjacent area. The neck portion is simultaneously manufactured. The manufacturing of the neck portion can be performed before or after the resonance box portion, or in parallel with the resonance box portion. The stringed instrument is completed by attaching the manufactured neck portion to the fabricated resonance box portion.

(Feature of Invention of Claim 13)

A manufacturing method of a stringed instrument according to an invention of claim 13 (hereinafter, referred to as a "manufacturing method of claim 13" when appropriate) is the manufacturing method of claim 12, and further, the neck portion is fabricated-by the additive fabrication method.

According to the manufacturing method of claim 13, the neck portion is also fabricated by the additive fabrication method in addition to the resonance box portion, and therefore, a cost reduction owing to uniformity of a raw material becomes possible according to circumstances, in addition to the function and effect of the manufacturing method of claim 12. Besides, it becomes possible to make material constants different between the desired area and the adjacent area also at the neck portion, and thereby, it contributes to an achievement of the performances (sound volume, acoustic quality, and acousmato) of the stringed instrument of the present invention as the instrument satisfying the preference of the player.

(Feature of Invention of Claim 14)

A manufacturing method of a stringed instrument according to an invention of claim 14 (hereinafter, referred to as a "manufacturing method of claim 14" when appropriate) is the manufacturing method of claim 12 or claim 13, and further, the additive fabrication method is a method in which synthetic resin powder is sintered by light irradiation, and a difference of the material constants is generated by a condition change control of the light irradiation.

According to the manufacturing method of claim 14, it is possible to generate the difference of the material constants while making a starting material of the additive fabrication common if the additive fabrication method is performed by the condition change of the light irradiation, in addition to the function and effect of the manufacturing method of claim 12 or claim 13, and therefore, it is not necessary to prepare different starting materials, to enable to perform a very effective stringed instrument manufacturing.

(Feature of Invention of Claim 15)

A manufacturing method of a stringed instrument according to an invention of claim 15 (hereinafter, referred to as a "manufacturing method of claim 15" when appropriate) is the manufacturing method of claim 14, and further, any one or both of the neck portion and the resonance box portion is (are) fabricated by being separated into an outside contour portion fabricated by sintering and an enclosed space portion enclosed by the outside contour portion, and unsintered synthetic resin powder is remained inside the enclosed space portion.

According to the manufacturing method of claim 15, vibrational characteristics of any one or both of the whole of the neck portion and the resonance box portion change(s) compared to a case when the enclosed space portion does not exist owing to a function of the unsintered synthetic resin powder remained in the enclosed space portion, in addition to the function and effect of the manufacturing method of claim 14. A degree of the change is adjusted, and thereby, it becomes possible to achieve the performances (sound volume, acoustic quality, and acousmato) of the stringed instrument of the present invention as the instrument satisfying the preference of the player. Further, a specific gravity of the unsintered synthetic resin powder inside the enclosed space portion is lighter than a specific gravity of the sintered outside contour portion, and therefore, it is possible to reduce a weight of not only the neck portion but also the whole of the stringed instrument for the extent.

(Feature of Invention of Claim 16)

A manufacturing method of a stringed instrument according to an invention of claim 16 (hereinafter, referred to as a "manufacturing method of claim 16" when appropriate) is the manufacturing method of claim 14, and further, any one or both of the neck portion and the resonance box portion is (are) fabricated by being separated into an outside contour portion fabricated by sintering and a space portion surrounded by the outside contour portion. At least one discharge hole to discharge the unsintered synthetic resin powder remained in the space portion is provided at the outside contour portion. The discharge hole after the unsintered synthetic resin powder is discharged maintains an open state or is closed by a closing member.

According to the manufacturing method of claim 16, the vibrational characteristics of any one or both of the whole of the neck portion and the resonance box portion change(s) compared to a case when the space portion is not fabricated because the space portion is fabricated (it is not fabricated by sintering) in addition to the function and effect of the manufacturing method of claim 14. A degree of the change is adjusted, and thereby, it becomes possible to achieve the performances (sound volume, acoustic quality, and acousmato) of the stringed instrument of the present invention as the instrument satisfying the preference of the player. Further, it is possible to reduce a weight of not only the neck portion but also the whole of the stringed instrument for the extent because the space portion is fabricated. As a result of the fabrication, the synthetic resin powder remained inside the space portion is discharged outside via the discharge hole. Discharging methods such as a gravity fall, suction from external, further injection of compressed air can be cited as examples. When the closing member is used, the space portion is enclosed by the closure thereof.

(Feature of Invention of Claim 17)

A manufacturing method of a stringed instrument according to an invention of claim 17 (hereinafter, referred to as a "manufacturing method of claim 17" when appropriate) is the manufacturing method of claim 12 or claim 13, and further, the additive fabrication method is the one in which a liquid state raw material is solidified by light irradiation, and the difference of the material constants is generated by a condition change control of a general mixture ratio of plural liquid state raw materials.

According to the manufacturing method of claim 17, it is possible to minutely generate the difference of the material constants if the difference is generated by the condition change of the general mixture ratio of the plural liquid state raw materials in the additive fabrication method. It is therefore possible to perform a very effective stringed instrument manufacturing when the performances (sound volume, acoustic quality, and acousmato) of the instrument are adjusted, in addition to the function and effect of the manufacturing method of claim 12 or claim 13.

(Feature of Invention of Claim 18)

A manufacturing method according to an invention of claim 18 (hereinafter, referred to as a "manufacturing method of claim 18" when appropriate) is the manufacturing method of claim 17, and further, any one or both of the neck portion and the resonance box portion is (are) fabricated by being separated into an outside contour portion fabricated by solidification and an enclosed space portion enclosed by the outside contour portion, and a support which is fabricated by solidification in parallel with the outside contour portion to support the solidification fabrication when the outside contour portion is fabricated by solidification is remained inside the enclosed space portion.

According to the manufacturing method of claim 18, vibrational characteristics of any one or both of the whole of the neck portion and the resonance box portion change(s) compared to a case when the enclosed space portion does not exist owing to a function of the support remaining in the enclosed space portion, in addition to the function and effect of the manufacturing method of claim 17. A degree of the change is adjusted, and thereby, it becomes possible to achieve the performances (sound volume, acoustic quality, and acousmato) of the stringed instrument of the present invention as the instrument satisfying the preference of the player.

(Feature of Invention of Claim 19)

A manufacturing method according to an invention of claim 19 (hereinafter, referred to as a "manufacturing method of claim 19" when appropriate) is the manufacturing method of claim 17, and further, any one or both of the neck portion and the resonance box portion is (are) fabricated by being separated into an outside contour portion fabricated by solidification and a space portion surrounded by the outside contour portion, and at least one discharge hole to discharge the support to support the solidification fabrication of the outside contour portion remained in the space portion is provided at the outside contour portion, and the discharge hole after the support is discharged maintains an open state or is closed by a closing member.

According to the manufacturing method of claim 19, vibrational characteristics of any one or both of the whole of the neck portion and the resonance box portion change(s) compared to a case when the space portion is not fabricated because the space portion is fabricated (it is not fabricated by solidification) in addition to the function and effect of the manufacturing method of claim 17. A degree of the change is adjusted, and thereby, it becomes possible to achieve the performances (sound volume, acoustic quality, and acousmato) of the stringed instrument of the present invention as the instrument satisfying the preference of the player. Further, it is possible to reduce a weight of not only the neck portion but also the whole of the stringed instrument for the extent because the space portion is fabricated. The support formed inside the space portion at the fabrication time is discharged outside via the discharge hole. Discharging methods such as washing by means of water and so on, blowing-out removal by means of water-jet, scraping out or scraping off by a tool in wiriness, and so on can be cited as examples. When the closing member is used, the space portion is enclosed by the closure.

(Feature of Invention of Claim 20)

A stringed instrument manufacturing apparatus according to an invention of claim 20 (hereinafter, referred to as an "apparatus of claim 20" when appropriate) is an apparatus to manufacture a stringed instrument by performing the manufacturing method of the stringed instrument according to any one of claims 12 to 19.

According to the apparatus of claim 20, it is possible to achieve performances (sound volume, acoustic quality, and acousmato) of an instrument satisfying a preference of a player and a purpose of performance by the manufactured stringed instrument because the stringed instrument is manufactured by the manufacturing method according to any one of claims 12 to 19.

According to the present invention, it is possible to provide a stringed instrument, a manufacturing method thereof, and further a manufacturing apparatus thereof capable of corresponding to a preference of a player (user) of the stringed instrument, a purpose of performance; and so on as much as possible.

BRIEF DESCRIPTION OF THE DRAWINGS

FIGS. 3(a) to 3(c) are schematic diagrams when several pieces of constituting portions are separately manufactured from an instrument main body of a stringed instrument of the present invention illustrated in FIG. 2;

FIGS. 4(a) and 4(b) are explanatory views illustrating an example manufacturing a resonance box portion of a violin by a contact bonding method using plural laser irradiation conditions;

FIG. 9 is a gray scale (grays of which degrees of lightness are different are painted into several stages from white to black) representing a result in which a static structural analysis by a finite element method of the stringed instrument of the present invention is performed by using (importing) data of a three-dimensional structure of a violin created by using a three-dimensional CAD and so on;

FIG. 10 is performed and boundary elements are imported, and an acoustic analysis by means of a fast multipole boundary element method (FMBEM) is performed;

FIGS. 13(a) to 13(c) are structural views of a violin as an example of the stringed instrument of the present invention.

Figure 1A:
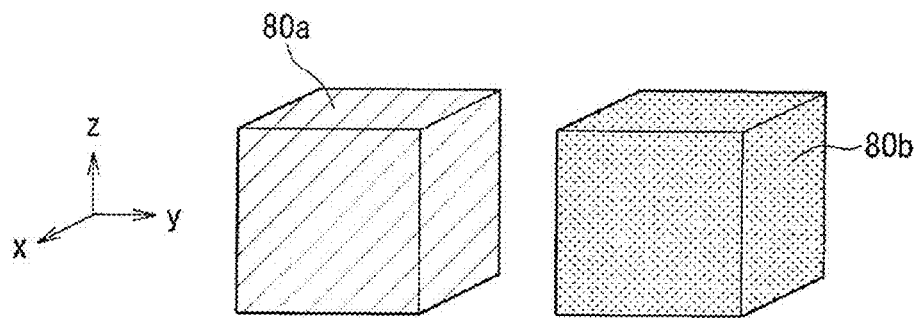
FIGS. 1(a) to 1(c) are explanatory views to explain that plural three-dimensional structures formed by changing laser irradiation conditions are integrally formed.

EXPLANATION OF CODES 1 violin
2 resonance box portion
3 neck portion
4 instrument main body
5 chin rest
6 tail-piece
7 tail-gut
8 endpin
9 adjuster
10 bridge
11a, 11b, 11c, 11d string
12a, 12b, 12c, 12d peg
13 sound post
14, 15 f hole
16 top plate portion
17 back plate portion
18a, 18b, 18c, 18d, 18e, 18f side plate portion
19a, 19b, 19c, 19d, 19e, 19f block
20 saddle
21 bass bar
22a, 22b, 22c, 22d, 22e, 22f purfling
23a, 23b, 23c, 23d, 23e, 23f lining
50 neck
51 fingerboard
52 nut
53 scroll
54 pegbox
70, 71, 72 arrow defining direction
80a, 80b cubic block
81, 82 rectangular solid block
83 portion redundantly manufactured with two laser irradiation conditions A, B
100 semiresonance box
101 top plate portion
102 bass bar
103 saddle
104 neck
105 fingerboard
106 nut
107, 108 fitting surface
110, 111 groove
150 rectangular solid three-dimensional structure
151 corner portion
152 outside contour portion
153 powder
153a space portion
180 fingerboard
181, 187a, 187b, 187c, 187d insertion hole (discharge hole)
182 reinforcing member
184, 185 space portion
186, 186a, 186b, 186c, 186d closing member
188a, 820 arrow
189 neck portion
190a, 190b material powder
200 instrument main body
401 resonance box portion
402a portion group
402b top plate portion
511, 521 top plate portion
511a, 511b, 521a, 521b, 521c portion manufactured by various laser irradiation conditions
800 resonance box portion
801 neck portion
803a, 803b recessed portion
804 combined groove
805a, 805b projecting portion
806 combined portion
810 workbench
900 outside contour portion line
901 bending of neck
902 tip portion (point) of scroll in z' direction
L-L', M-M' cross section (cross section indication symbol)
o original point
P, Q arrow
x, y, z axis (direction)
x', y', z' axis (direction)
$L_1$, $L_2$ liquid state raw material
N-N' cross section (cross section indication symbol)
$\phi$, $\theta$, $\omega$ angle (rotation disposition angle)
$c_{11}$, $c_{12}$, $c_{13}$, $c_{33}$, $c_{44}$, $c_{66}$ elastic stiffness constant
$c'_{pq}$ elastic stiffness constant after tensor transformation (p, q=1, 2, 3, 4, 5, 6)
$l_1$, $l_2$, $l_3$, $m_1$, $m_2$, $m_3$, $n_1$, $n_2$, $n_3$ component of direction cosine in matrix display
$[L_T]$, $[L_S]$ matrix

DETAILED DESCRIPTION OF THE PREFERRED EMBODIMENT(S)

Hereinafter, a technology applied in the present invention and a best mode for carrying out the present invention (hereinafter, referred to as the "present embodiment" when appropriate) will be described in detail with reference to the drawings, tables, and numerical expressions. Note that an outline relating to an additive fabrication method is to be referred to the above-stated non-patent documents 5, 6, 7. The additive fabrication method in which a stringed instrument as a three-dimensional structure is formed by performing a selective sintering using light such as laser, electron beams, and so on while using powder of synthetic resin, metal, and so on in simple substance or mixed state as a raw material is used in the present invention if in there is no description in particular. In the present description, when an xyz axis coordinate system centering on an original point "o" is considered, material powder is spread uniformly with a roller, a blade, or the like on a surface in parallel with an xy plane, and it is defined to be laminated in a z direction if there is no description in particular.

In the present description, a case is described as an example when an EOSINT P385 (trademark, hereinafter, this fabrication apparatus is called as "the present fabrication apparatus") being a laser sintering type RP (Rapid Prototyping) system manufactured by EOS company (Germany) is used as a fabrication apparatus using the additive fabrication method forming the three-dimensional structure by performing the selective sintering while using the powder as the raw material if there is no description in particular. Measurement values represented in later-described table 1 are obtained from a test piece manufactured by using synthetic resin powder (EOS company model number PA2200, color is white, trademark) of which main constituent is nylon 12 (trademark, polyamide synthetic resin), having thermoplasticity as a raw material of a three-dimensional structure, and by following manufacturing conditions in the table 1 by using the present fabrication apparatus. The present fabrication apparatus is an apparatus (system) converting a data of a three-dimensional structure (STL format and so on) created by using a three-dimensional CAD software, a three-dimensional modeling system, and so on into a data group in a cross-sectional shape called as a slice data (SLI format), and selectively sintering the raw material powder by irradiating laser emitted from a mounted $CO_2$ laser generation apparatus to a layer of the synthetic resin (plastic) powder spread in parallel with the xy plane by using the slice data, and a desired three-dimensional structure is manufactured by repeatedly laminating this for a number of times.

The three-dimensional structure manufactured by the additive fabrication method forming the three-dimensional structure by performing the laser sintering while using the powder as the raw material generally has anisotropic characteristics similar to a tetragon when it is seen in broad perspective because of a process method in which the additive fabrication method laminates the layers in parallel with the xy plane for several layers in a z direction. When an anisotropic elastic stiffness constant of the tetragon is represented by an engineering notation, it is represented by the following numeral expression (1).

$$\begin{bmatrix} c_{11} & c_{12} & c_{13} & 0 & 0 & 0 \\ c_{12} & c_{11} & c_{13} & 0 & 0 & 0 \\ c_{13} & c_{13} & c_{33} & 0 & 0 & 0 \\ 0 & 0 & 0 & c_{44} & 0 & 0 \\ 0 & 0 & 0 & 0 & c_{44} & 0 \\ 0 & 0 & 0 & 0 & 0 & c_{66} \end{bmatrix} \quad (1)$$

Material constants (for example, elastic stiffness constant, density) for the three-dimensional structure manufactured by the additive fabrication method fabricating the three-dimensional structure by performing the selective laser sintering while using the powder as the raw material may be changed by changing a laser irradiation condition being a sintering condition. As an example, the table 1 represents the measurement values of the elastic stiffness constants and the densities at an elastic area of the three-dimensional structures manufactured under two kinds of laser irradiation conditions A, B. The measurement values of the elastic stiffness constants $c_{11}$, $c_{12}$, $c_{13}$, $c_{33}$, $c_{44}$, $c_{66}$ represented at the table 1 are values in which Japan Industrial Standards JIS K7161, JIS K7162, JIS K7079 are referred to, Young's modulus, Poisson's ratio, modulus of rigidity at the elastic area by each of xyz directions of test pieces manufactured in the same batch under the two kinds of laser irradiation conditions A, B by each of the xyz directions are measured by using a universal tester (tensile tester) and a strain gauge, and they are calculated from the measurement values on an assumption that the three-dimensional structure manufactured by the additive fabrication method represents the similar characteristics as the tetragon at the elastic area. Besides, the measurement values of the density represented at the table 1 are measurement values calculated from measurements obtained by measuring sizes and weights of approximately cubic (one edge is approximately 20 mm) solid blocks manufactured under the two kinds of laser irradiation conditions A, B.

When the measurement values of the elastic stiffness constant in the table 1 are compared by each item, the elastic stiffness constants represent values in which the measurement values under the laser irradiation condition B are uniformly smaller than the measurement values under the laser irradiation condition A. When a square bar (size: 100×10×4 mm) manufactured under the laser irradiation condition A is compared with a square bar (size: 100×10×4 mm) manufactured in the same batch and by under the laser irradiation condition B of which manufacturing condition is almost the same as the square bar manufactured under the laser irradiation condition A other than the laser irradiation condition by bending the square bars respectively with both hands in a vicinity of both ends in a longitudinal direction (direction of 100 mm), it is sensuously sensed that the square bar manufactured under the laser irradiation condition B is softer (easy to bend) than the square bar manufactured under the laser irradiation condition A.

When the measurement values of the density in the table 1 are compared by each item, the measurement values under the laser irradiation condition B are smaller values than the measurement values under the laser irradiation condition A as for the density.

In this table 1, the detailed conditions of the two kinds of laser irradiation conditions A, B and the measurement values of the density and the elastic stiffness constant of the three-dimensional structures obtained by the above are represented. Incidentally, there are thousands of conditions such as laser irradiation conditions C, D, E, . . . in addition to the two laser irradiation conditions in the additive fabrication method forming the three-dimensional structure by the laser sintering while using the powder as the raw material, and the material constants such as the elastic stiffness constant, the density of the three-dimensional structures manufactured under respective conditions are different.

Note that the measurement values represented in the table 1 are the measurement values obtained by measuring the test pieces all obtained from the same batch by using the EOSINT P385 being the present fabrication apparatus. However, there is a possibility in which some numerical variation occur caused by external factors and so on such as a state of the material powder, a manufacturing position (disposed position) of the three-dimensional structure, an individual difference of a fabrication apparatus, a room temperature, an indoor environment. However, there is a difference in the measurement values of the material constants (elastic stiffness constant and density) relatively in the three-dimensional structures manufactured at least in the same batch and under using the laser irradiation conditions A, B.

TABLE 1

| MANUFACTURING CONDITION | ADDITIVE FABRICATION APPARATUS MAKER, MODEL | EOS (GERMANY), EOSINT P385 |
|---|---|---|
| | LAMINATION PITCH IN z DIRECTION | 0.15 mm |
| | REMOVAL CHAMBER HEAT INSULATION SET TEMPERATURE | 120.0° C. |
| | LASER IRRADIATION SURFACE HEATING SET TEMPERATURE | 177.5° C. |
| | ATMOSPHERE IN PROCESS CHAMBER | NITROGEN FLOW ATMOSPHERE |
| | MODEL NUMBER OF MATERIAL POWDER | PA2200 (MAIN CONSTITUENT IS NYLON 12) |

TABLE 1-continued

|  |  | | |
|---|---|---|---|
| | BULK DENSITY OF MATERIAL POWDER | 0.435-0.445 g/cm³ (EOS PUBLISHED VALUE, DEPEND ON CIRCUMSTANCES) | |
| | LASER HATCHING DIRECTION | x, y | |
| | Skywriting FUNCTION | ON | |
| | Alternating FUNCTION | ON | |
| | NAME OF LASER IRRADIATION CONDITION | LASER IRRADIATION CONDITION A | LASER IRRADIATION CONDITION B |
| | LASER HATCHING INTERVAL | 0.30 mm | 0.30 mm |
| | LASER SCANNING SPEED | 1100 mm/second | 4500 mm/second |
| | LASER POWER SETTING VALUE (NOTE 1) | 28% | 80% |
| | LASER POWER EFFECTIVE REDUCED VALUE (NOTE 2) | 20.5 W | 48.3 W |
| MEASUREMENT VALUE | $c_{11}$ MEASUREMENT VALUE | 3.02 GPa | 2.66 GPa |
| | $c_{12}$ MEASUREMENT VALUE | 1.63 GPa | 1.39 GPa |
| | $c_{13}$ MEASUREMENT VALUE | 1.51 GPa | 1.30 GPa |
| | $c_{33}$ MEASUREMENT VALUE | 2.72 GPa | 2.43 GPa |
| | $c_{44}$ MEASUREMENT VALUE | 0.602 GPa | 0.527 GPa |
| | $c_{66}$ MEASUREMENT VALUE | 0.691 GPa | 0.635 GPa |
| | DENSITY MEASUREMENT VALUE OF THREE-DIMENSIONAL STRUCTURE | 0.942 g/cm³ | 0.898 g/cm³ |
| | ROOM TEMPERATURE AT TEST PIECE MEASUREMENT TIME (NOTE 3) | 23° C. ± 2° C. (CONDITIONING FOR 48 HOURS OR MORE IS PERFORMED FOR TEST PIECE) | |
| | RELATIVE HUMIDITY AT TEST PIECE MEASUREMENT TIME (NOTE 3) | 50% ± 5% (CONDITIONING FOR 48 HOURS OR MORE IS PERFORMED FOR TEST PIECE) | |

(NOTE 1) Catalog maximum value of Laser Power is 50 W. Power setting value of P385 is set at % value . . .
(NOTE 2) Laser effective measurement value at a focal position is 54.9 W (100%) when laser maximum power (100%) is set.
(NOTE 3) Conditioning and measurement are performed in constant temperature and humidity indoor environment.

A concept of a method manufacturing an integrally formed three-dimensional structure of which material constants such as the elastic stiffness constant and the density are partially (selectively) different by using at least two kinds or more of these laser irradiation conditions is described below.

Figure 1B:
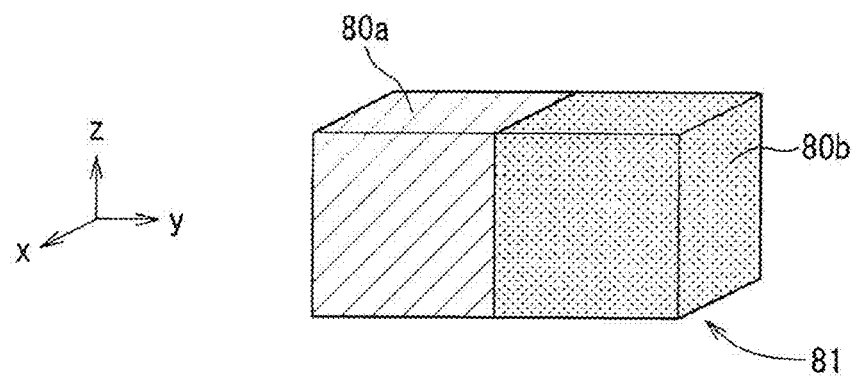
Figure 1C:
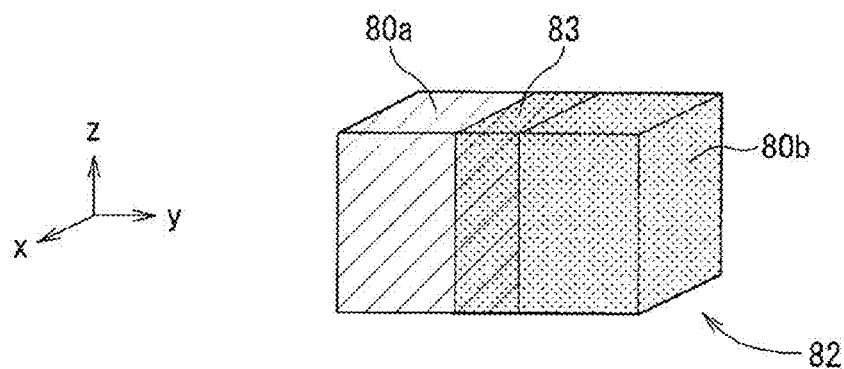

FIGS. 1(a) to 1(c) are explanatory views to explain that plural three-dimensional structures formed by changing the laser irradiation conditions are integrally formed. FIG. 1(a) represents that a cubic block formed under the laser irradiation condition A and a cubic block formed under the laser irradiation condition B are in non-contact when the cubic blocks in the same size are formed under, for example, the laser irradiation conditions A, B represented in the table 1. FIG. 1(b) represents a state in which a disposition relationship of the cubic block formed under the laser irradiation condition A and the cubic block formed under the laser irradiation condition B is in contact when the cubic blocks in the same size are formed under, for example, the laser irradiation conditions A, B represented in the table 1. FIG. 1(c) represents a state in which the disposition relationship of the cubic block formed under the laser irradiation condition A and the cubic block formed under the laser irradiation condition B are overlapped when the cubic blocks in the same size are formed by, for example, the laser irradiation conditions A, B represented in the table 1.

FIG. 1(a) represents a disposition data in which a cubic block 80a (a shaded hatching portion) which is given a manufacturing instruction by the laser irradiation condition A in a fabrication process and a cubic block 80b (a dotted hatching portion) which is given the manufacturing instruction by the laser irradiation condition B are three-dimensionally disposed under the non-contact state on a data. As a result of the fabrication by this disposition data, the three-dimensional structures to be completed are one by one cubic blocks in approximately the same size of which elastic stiffness constants and the densities (refer to table 1) are different.

FIG. 1(b) represents a disposition data in which one surface of the cubic block 80a (for example, this area is set to be a "three-dimensional desired area") which is given the manufacturing instruction by the laser irradiation condition A in the fabrication process and one surface of the cubic block 80b (a "three-dimensional adjacent area" adjacent to the "desired area" in the above example) which is given the manufacturing instruction by the laser irradiation condition B are three-dimensionally disposed under a state in a contact position on the data. As a result of the fabrication by this disposition data, the three-dimensional structure to be completed is a piece of rectangular solid block 81 of which elastic stiffness constants and the densities (refer to table 1) approximately follow to the laser irradiation in conditions A, B by each part. In the present invention, the method to obtain a three-dimensional structure in which plural three-dimensional structures are disposed to be in contact and integrated as described by using FIG. 1(b) is called as a contact bonding method.

FIG. 1(c) represents a disposition data in which the cubic block 80a which is given the manufacturing instruction by the laser irradiation condition A in the fabrication process and the cubic block 80b which is given the manufacturing instruction by the laser irradiation condition B are three-dimensionally disposed under a state in an overlapped position on the data. As a result of the fabrication by this disposition data, the three-dimensional structure to be completed is a piece of rectangular solid block 82 of which elastic stiffness constants and the densities (refer to table 1) approximately follow to the laser irradiation conditions A, B by each part. Further, a portion 83 manufactured under the two laser irradiation conditions A, B in the overlapped state represents values different from the elastic stiffness constant and the density manufactured under the laser irradiation conditions A, B represented in the table 1 because the laser irradiations are also overlapped. In the present invention, the method to obtain a three-dimensional structure in which plural three-dimensional structures are disposed to be overlapped and integrated as described by using FIG. 1(c) is called as an overlap bonding method.

As stated above, it is possible for the additive fabrication method in which the three-dimensional structure is formed by the laser sintering while using the powder as the raw material, to change the elastic stiffness constant and the density of the manufactured three-dimensional structure by changing the laser irradiation condition. Besides, it is possible to form the three-dimensional structure under a state in which plural three-dimensional structures of which elastic stiffness constants and the densities are different are bonded with each other. In other words, it is possible to form the three-dimensional structure under a state in which the elastic stiffness constant and the density at an arbitrary part are selectively made different from the whole of the three-dimensional structure. One aspect of the present invention is to apply this method to manufacture of the stringed instrument.

It is often the case that kinds of woods used for the manufacturing of each portion are different in a conventional wooden violin family manufactured by using wood heavily. For example, in case of a violin, it is often the case that maple and so on are used to manufacture a neck integrally including a scroll and a pegbox, a back plate portion, side plate portions, and a bridge. Spruce is often used for a top plate portion and a bass bar, and ebony wood and so on of which stiffness is relatively high among the woods is often used for a fingerboard being a component of the neck portion, a tail-piece, pegs, a saddle, and a nut. Kinds of wood, metal, synthetic resin, or the like suited for manufacturing each of the other portions are used. As stated above, the kinds of woods or the materials are changed depending on the respective portions owing to knowledge obtained by studies of many people for a long time relating to the violin family sounding by using resonance effect of sound and so on. The material of each portion determines performances (sound volume, acoustic quality, and acousmato) of an instrument even though shapes thereof are the same.

In case of the violin family, strings vibrate by rubbing them with a bow, this energy of the vibration is transmitted to the top plate portion of the resonance box portion via the bridge, the energy of the vibration is further transmitted to a block, the side plate portions, the back plate portion, the bass bar, and a sound post, and as a result, almost the whole of the stringed instrument vibrates and the sound is generated. When an object which is assumed to vibrate is designed, the material constants such as an elastic constant and the density are fundamental. As it is described later, it is possible to change the material constants such as the elastic stiffness constant and the density by each portion selectively or by each specific part selectively by changing the laser irradiation condition and so on according to the present invention. It is therefore possible to adjust the performances (sound, volume, acoustic quality, and acousmato) of the instrument in wide variety.

Besides, as it is described above, the three-dimensional structure manufactured by the additive fabrication method has the anisotropy, and therefore, it is possible to change mechanical properties including the vibrational characteristics of the manufactured three-dimensional structure by changing a fabrication direction of the three-dimensional structure relative to a z direction (lamination direction). It is assumed that a cylindrical three-dimensional structure (round bar three-dimensional structure) of which cross section is a circle and of which height (length) is enough larger than a diameter of the circle being cross section is manufactured by using the additive fabrication method, and a case is exemplified when the three-dimensional structure is manufactured by laminating in a height (length) direction of this cylinder (cumulating the circles), the fabrication direction means a direction of a center of a last layer (the center of the circular cross section of the last layer) when it is seen from a center of a first layer (the center of the circular cross section of the first layer) when the additive fabrication of the three-dimensional structure is performed. Namely, in this case, when the fabrication direction matches with a vertical direction, the fabrication direction matches with the lamination direction (z direction).

On the other hand, in the additive fabrication method, it is possible to change the mechanical characteristics of the three-dimensional structure by using that the elastic stiffness constant is adjusted by making the fabrication direction of the cylindrical three-dimensional structure relative to the z direction different (by giving gradient to the fabrication direction relative to the z direction). In case of the present invention, it is possible to adjust the performances (sound volume, acoustic quality, and acousmato) of the stringed instrument of the present invention as a result of changing the mechanical properties including the vibrational characteristics (for example, a natural resonance frequency, a vibrational mode, a vibrational amplitude) held by the stringed instrument of the present invention by changing the fabrication direction by using a process method unique to this additive fabrication method (the process method in which the gradient is given to the fabrication direction relative to the z in direction). It is also possible to satisfy a player's preference, a purpose of the performance, and so on by this adjustment.

There also is a method in which sintering is performed by irradiating electron beams in addition to the method performing the sintering by irradiating laser in the additive fabrication method in which a three-dimensional structure is formed by performing the selective sintering (coexistence between a portion sintered and a portion not sintered, in which the portion not sintered remains as powder) while using powder as a raw material. It is possible to adjust the material constants (elastic constant, density, and so on) of the three-dimensional structure, and further, to perform the contact bonding method and the overlap bonding method by changing electron beam irradiation conditions also in the additive fabrication method forming the three-dimensional structure by irradiating the electron beams.

Figure 2:
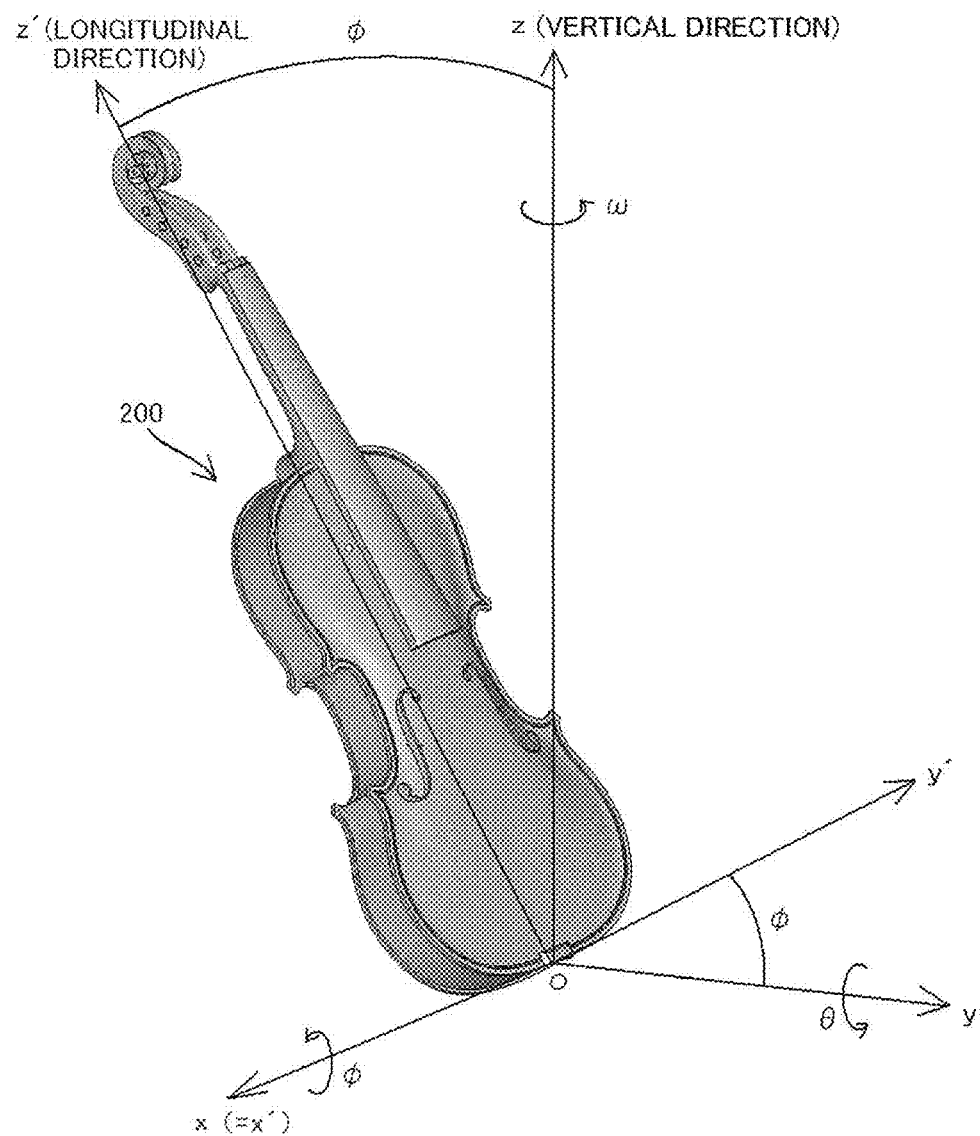
FIG. 2 is an explanatory view to explain a definition of a fabrication direction of the three-dimensional structure in the present invention.

FIG. 2 is an explanatory view to explain a definition of the fabrication direction of the three-dimensional structure in the present invention. In the present invention, when the xyz axis coordinate system centering on the original point "o" is considered, a case is defined to be a reference angle when an instrument main body 200 of a violin is manufactured, when a length direction represented by an arrow 70 in FIG. 13 matches with the z direction (lamination direction), a width direction represented by an arrow 71 matches with the x direction, and a thickness direction represented by an arrow 72 matches with a y direction. When it is considered as an example to manufacture the instrument main body 200 of the stringed instrument of the present invention by inclining from this reference angle, rotation angles of the instrument are defined to be an angle $\phi$ about the x axis, an angle $\theta$ about the y axis, and an axis $\omega$ about the z axis. A length direction is set to be a z' direction, a width direction is set to be an x' direction, and a thickness direction is set to be a y' direction after the instrument main body 200 of the present invention is rotationally disposed for the angles $\phi$, $\theta$, $\omega$. When all of the angles $\phi$, $\theta$, $\omega$ are "0" (zero) degree (reference angle), it means that the x axis and the x' axis match, the y axis and the y' axis match, and the z axis and the z' axis match. FIG. 2 represents a case when the stringed instrument of the present invention is rotationally disposed for the angle $\phi$ about the x axis as an example. In this case, the y' axis inclines for the angle $\phi$ relative to the y axis, and the z' axis inclines for the angle $\phi$ relative to the z axis, but the x axis and the x' axis match. An elastic stiffness constant $[c'_{pq}]$ (p, q=1, 2, 3, 4, 5, 6) applied to the xy'z' (x'y'z') axis coordinate system at this time is required to be calculated by performing a tensor transformation of the elastic stiffness constant represented by the numerical expression (1), and it can be calculated by using the following numerical expressions (2), (3), (4), (5).

$$\begin{bmatrix} l_1 & m_1 & n_1 \\ l_2 & m_2 & n_2 \\ l_3 & m_3 & n_3 \end{bmatrix} = \begin{bmatrix} 1 & 0 & 0 \\ 0 & \cos\phi & \sin\phi \\ 0 & -\sin\phi & \cos\phi \end{bmatrix} \quad (2)$$

$$[L_T] = \begin{bmatrix} l_1^2 & m_1^2 & n_1^2 & 2m_1n_1 & 2n_1l_1 & 2l_1m_1 \\ l_2^2 & m_2^2 & n_2^2 & 2m_2n_2 & 2n_2l_2 & 2l_2m_2 \\ l_3^2 & m_3^2 & n_3^2 & 2m_3n_3 & 2n_3l_3 & 2l_3m_3 \\ l_2l_3 & m_2m_3 & n_2n_3 & m_3n_2+n_3m_2 & l_3n_2+n_3l_2 & l_3m_2+m_3l_2 \\ l_3l_1 & m_3m_1 & n_3n_1 & m_3n_1+n_3m_1 & l_3n_1+n_3l_1 & l_3m_1+m_3l_1 \\ l_1l_2 & m_1m_2 & n_1n_2 & m_2n_1+n_2m_1 & l_2n_1+n_2l_1 & l_2m_1+m_2l_1 \end{bmatrix} \quad (3)$$

$$[L_S] = \quad (4)$$

$$\begin{bmatrix} l_1^2 & l_2^2 & l_3^2 & l_2l_3 & l_3l_1 & l_1l_2 \\ m_1^2 & m_2^2 & m_3^2 & m_2m_3 & m_3m_1 & m_1m_2 \\ n_1^2 & n_2^2 & n_3^2 & n_2n_3 & n_3n_1 & n_1n_2 \\ 2m_1n_1 & 2m_2n_2 & 2m_3n_3 & m_3n_2+n_3m_2 & m_3n_1+n_3m_1 & m_2n_1+n_2m_1 \\ 2n_1l_1 & 2n_2l_2 & 2n_3l_3 & l_3n_2+n_3l_2 & l_3n_1+n_3l_1 & l_2n_1+n_2l_1 \\ 2l_1m_1 & 2l_2m_2 & 2l_3m_3 & l_3m_2+m_3l_2 & l_3m_1+m_3l_1 & l_2m_1+m_2l_1 \end{bmatrix}$$

$$\begin{bmatrix} c'_{11} & c'_{12} & c'_{13} & c'_{14} & c'_{15} & c'_{16} \\ c'_{21} & c'_{22} & c'_{23} & c'_{24} & c'_{25} & c'_{26} \\ c'_{31} & c'_{32} & c'_{33} & c'_{34} & c'_{35} & c'_{36} \\ c'_{41} & c'_{42} & c'_{43} & c'_{44} & c'_{45} & c'_{11} \\ c'_{51} & c'_{52} & c'_{53} & c'_{54} & c'_{55} & c'_{56} \\ c'_{61} & c'_{62} & c'_{63} & c'_{64} & c'_{65} & c'_{66} \end{bmatrix} = \quad (5)$$

$$[L_T] \begin{bmatrix} c_{11} & c_{12} & c_{13} & 0 & 0 & 0 \\ c_{12} & c_{11} & c_{13} & 0 & 0 & 0 \\ c_{13} & c_{13} & c_{33} & 0 & 0 & 0 \\ 0 & 0 & 0 & c_{44} & 0 & 0 \\ 0 & 0 & 0 & 0 & c_{44} & 0 \\ 0 & 0 & 0 & 0 & 0 & c_{66} \end{bmatrix} [L_S]$$

The elastic stiffness constant $[c'_{pq}]$ after the tensor transformation obtained by the—above-stated numerical expressions is important when the stringed instrument of the present invention is designed. Namely, when the stringed instrument of the present invention is designed, the angles $\phi$, $\theta$, $\omega$ are important design items, and concrete application method for the design of the stringed instrument in the present invention is described in detail at a later-described section of a design method of the stringed instrument.

Namely, it is possible to integrally fabricate the instrument main body 200 (the resonance box portion and the neck portion) as illustrated in FIG. 2 by using the additive fabrication method. For example, a possibility of a trouble of the instrument caused by a sudden drop impact accident or the like by a user is low compared to a conventional wooden violin family and so on. For example, there is a case when an adhesive between the top plate portion and the side plate portions peels off by the drop impact, and it is often the case that it becomes a reason for a trouble of the violin. It is not necessary for an integral fabrication to use the adhesive between members, and therefore, the trouble caused by the peeling off of the adhesive which may occur if the adhesive is used does not exist. Besides, an occurrence of a performance difference by individual resulting from an assembling by using the adhesive such as the conventional wooden violin family is none at all. Further, a pasting by using the adhesive is originally not necessary, and therefore, time for assembling is saved, and a manufacturing cost can be reduced for the saved time.

Tuning of the violin family is performed by tightening and loosening the strings by turning screws of pegs and an adjuster before a performance. Besides, a vibrational frequency is generally changed by changing a length of a part of the vibrating string by pinching the string with a left hand finger and the fingerboard to thereby play music in the violin family. The nut, the fingerboard, and holes to mount the pegs of the pegbox are rubbed and worn-out caused by the reason as stated above, and therefore, it is desirable that these worn-out portions are exchangeable. Besides, plastic deformation occurs in the saddle because it is pressed by repeating the turning, so it is also desired to be exchangeable. Further, there is a case when a sound with high frequency is generally obtained by quickly moving a position where the left hand holds the neck (position moving) as a technique at the performance time, and therefore, the neck is rubbed and worn-out. The neck is therefore desired to be exchangeable. In addition, it is possible to adjust and improve the performances of the instrument, namely, the sound volume, the acoustic quality, and the acousmato by changing each size of the portion constituting the resonance box portion in particular by performing a cutting process and so on. A case when several pieces of constituting portions are separately manufactured from the instrument main body of the stringed instrument of the present invention represented in. FIG. 2 is described below in consideration of increasing flexibility in maintenance and improvement, and flexibility in adjustment of the stringed instrument of the present invention.

FIGS. 3(*a*) to 3(*c*) are schematic diagrams when the several pieces of constituting portions are separately manufactured from the instrument main body of the stringed instrument of the present invention illustrated in FIG. 2. FIG. 3(*a*) illustrates an example when a semiresonance box 100 in which the back plate portion integrally including the purfling, all of the side plate portions, all of the blocks, and all of the linings are integrally formed, a top plate portion 101 integrally including the purfling, a bass bar 102, a saddle 103, a neck 104 integrally including the scroll and the pegbox, a fingerboard 105, and a nut 106 are separately manufactured by using the additive fabrication method.

Figure 3B:
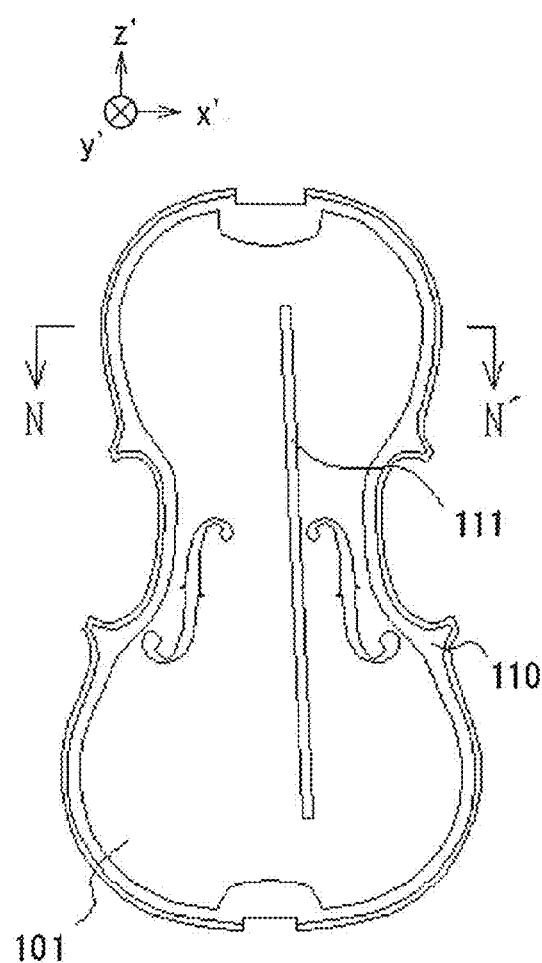
Figure 3C:
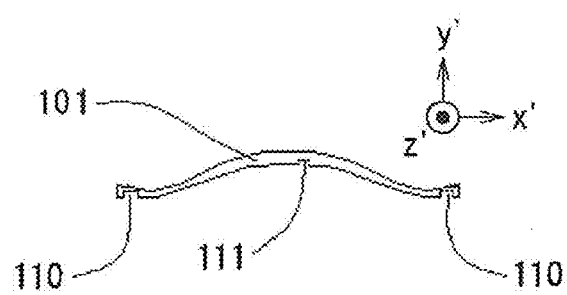

As it is illustrated in FIG. 3(*a*), when the several pieces of constituting portions are separately manufactured from the instrument main body of the stringed instrument of the present invention illustrated in FIG. 2, the instrument main body is assembled by adhering, welding, fitting by pressing, and so on. As illustrated in FIG. 3(*a*), when the instrument main body of the stringed instrument of the present invention is divided into several pieces of portions, and the instrument main body is assembled by the adhesion, the welding, the fitting by pressing, and so on, a possibility of the trouble such as the peeling off of the adhesive surface, a crack of a welded portion, and so on caused by the drop impact accident becomes high compared to the case when the instrument main body is integrally formed. However, as it is illustrated in FIG. 3(*a*), when the several pieces of constituting portions are separately manufactured from the instrument main body of the stringed instrument of the present invention illustrated in FIG. 2, finishing process such as polishing is easy to perform, and it is possible to disassemble the instrument main body into each portion after the assembling when the assembling is performed by using the fitting by pressing and the adhesive. Accordingly, if the method manufacturing the stringed instrument of the present invention by dividing into several pieces of portions as illustrated in FIGS. 3(a) to 3(c) is applied, it is possible to change the performances of the instrument in accordance with the preference of the user and so on without sacrificing an external appearance of the instrument main body and to exchange the portions wasted by worn-out because it becomes easy to perform the cutting process inside the resonance box portion before or after the assembling of the instrument main body. Besides, for example, the fingerboard 105, the saddle 103, the nut 106 may be replaced by the ones formed by cutting out from ebony wood and so on as same as the case when the conventional wooden violin is manufactured, depending on the preference of the user and so on.

Besides, when individual portions (the semiresonance box 100, the top plate portion 101, the bass bar 102, the saddle 103, the neck 104, the fingerboard 105, and the nut 106) constituting the instrument main body of the stringed instrument of the present invention illustrated in FIG. 3(a) are manufactured by using the additive fabrication method, each portion individually has the x', y', z' directions (the fabrication direction changed by the adjustment of the angles φ, θ, ω) satisfying the performances (sound volume, acoustic quality, and acousmato) of the stringed instrument and the design considering operability at the performance time. Namely, the individual portions (the semiresonance box 100, the top plate portion 101, the bass bar 102, the saddle 103, the neck 104, the fingerboard 105, the nut 106) illustrated in FIG. 3(a) are formed while being given their unique fabrication directions respectively, and as a result, a design range and an adjustment range of the performances, and so on of the stringed instrument of the present invention are expanded.

FIG. 3(b) illustrates a back surface of the top plate portion 101 (a surface constituting an inner surface of the resonance box portion when it is assembled), and FIG. 3(c) illustrates a cross section along a line N-N' illustrated in FIG. 3(b). As illustrated in FIG. 3(b), grooves 110, 111 are respectively disposed at the top plate portion 101. It is easily enabled to dispose the grooves 110, 111 at the top plate portion 101 by giving an instruction to dispose the grooves 110, 111 in advance for a data of a three-dimensional structure of the top plate portion 101 created by using a three-dimensional CAD and so on in the manufacturing of the stringed instrument using the additive fabrication method.

When the several pieces of constituting portions are separately manufactured from the instrument main body of the stringed instrument of the present invention, it is necessary to perform the assembling by appropriately using the process methods such as the adhesion, the welding, the fitting as stated above. Particularly, in the assembling of the resonance box portion, the grooves 110, 111 are disposed at the back surface of the top plate portion 101 as illustrated in FIG. 3(b) to assemble the semiresonance box 100, the top plate portion 101, and the bass bar 102 being major portions constituting the resonance box portion relatively easily while keeping a positional relationship as it is designed. In this case, the groove 110 has a shape in which a fitting surface 107 constituted by all of the side plate portions of the semiresonance box 100, all of the blocks, and all of the linings which are in contact with the top plate portion 101 when they are assembled as illustrated in FIG. 3(a) fits appropriately just as it is designed. Similarly, the groove 111 has a shape in which the bass bar 102 appropriately fits as it is designed. When a resonance box portion having a similar shape as a resonance box portion 401 in later-described FIGS. 4(a), 4(b), is assembled, the bass bar 102 is at first fitted by inserting a fitting surface 108 to the groove 111 disposed at the top plate portion 101, and it is fixed by using either the adhesion or the welding, or both of them. Next, the fitting surface 107 of the semiresonance box 100 is inserted into the groove 110 of the top plate portion 101 in which the fixing of the bass bar 102 is finished, and the semiresonance box 100 and the top plate portion 101 in which the fixing of the bass bar 102 is finished are fixed. Next, the assembling of the resonance box portion is finished by fixing the saddle 103 by using either the adhesion or the welding, or both of them. Note that either one method of the adhesion or the welding or both of the methods is (are) appropriately used for a bonding fixing.

Shapes complying with a case when the fitting surface 107 of the semiresonance box and the fitting surface 108 of the bass bar respectively have relatively simple surface shapes are exemplified as the shapes of the grooves 110, 111 illustrated in FIG. 3(b). When it is designed in which the fitting surfaces 107, 108 have further complicated curved surfaces and concave and convex state projections, the shapes of the grooves 110, 111 disposed at the top plate portion 101 are designed to comply with the design.

Note that an example of a method in which the semiresonance box 100 in which the back plate portion integrally including the purfling, all of the side plate portions, all of the linings which are in contact with the top plate portion 101 when they are assembled, and all of the blocks are integrally formed, the top plate portion 101 integrally including the purfling, the bass bar 102, and the saddle 103 are separately manufactured is illustrated in FIGS. 3(a) to 3(c), but it is possible to apply the other methods. For example, a method in which the semiresonance box is manufactured by integrally forming the top plate portion integrally including the purfling, the bass bar, all of the side plate portions, all of the linings, and all of the blocks, and the back plate portion integrally including the purfling and in which the fitting grooves are disposed, and the saddle are separately manufactured.

First Embodiment

FIGS. 4(a) and 4(b) are explanatory views illustrating an example manufacturing the resonance box portion of the violin by the contact bonding method using plural laser irradiation conditions. FIG. 4(a) is a front view of the resonance box portion, and FIG. 4(b) is a right side view of the resonance box portion. In FIGS. 4(a) and 4(b), the resonance box portion 401 is illustrated, and it is described on an assumption that the resonance box portion 401 is integrally formed by using the contact bonding method described by using FIG. 1(b). When the resonance box portion 401 is manufactured as an example of the present invention, a top plate portion 402b integrally including a dot-hatched purfling is manufactured by selectively using the laser irradiation condition B represented in the table 1, and the other oblique-hatched portion group 402a (the back plate portion integrally including the purfling, the side plate portions, the blocks, the linings, the bass bar, and the saddle) is manufactured by selectively using the laser irradiation condition A, and it is possible to manufacture the resonance box portion 401 by integrating them by using the contact bonding method. In this case, the whole of the top plate portion 402b is set as the three-dimensional desired area, the whole of the portion group 402a is the three-dimensional adjacent area. They may be reversed. Note that the bass bar, the linings, and the blocks except a part thereof included in the portion group 402a are not illustrated because they are disposed to keep out of sight inside the resonance box portion 401 in FIGS. 4(a) and 4(b). The resonance box portion 401 manufactured by this method has approximately the same shape, compared to a resonance box portion integrally manufactured by including the top plate portion by using, for example, only the laser irradiation condition A, but the vibrational characteristics are changed resulting from the difference in the elastic stiffness constants and the densities of the three-dimensional structures manufactured by the laser irradiation conditions A, B. As a result, the resonance box portion 401 of the stringed instrument of the present invention is enabled while adjusting the performances (sound volume, acoustic quality, and acousmato) of the instrument, and of which weight is reduced.

Second Embodiment

Figure 5A:
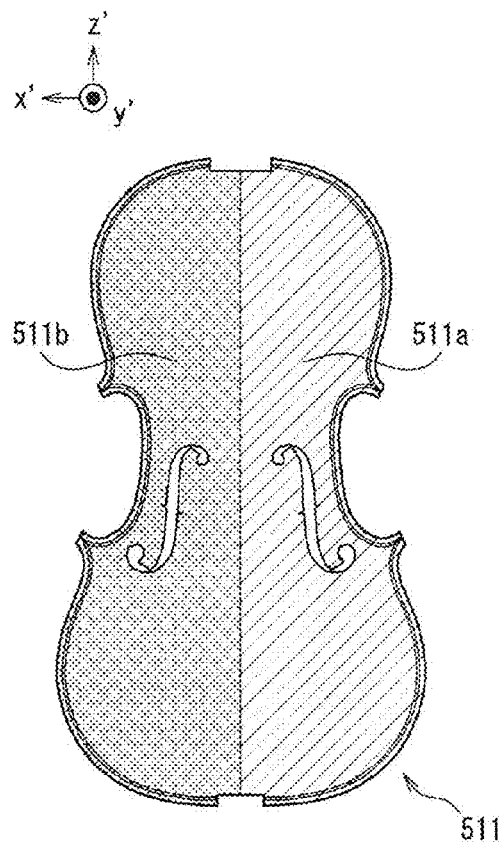
FIGS. 5(a) and 5(b) are explanatory views illustrating an example manufacturing a top plate portion of a violin by using plural laser irradiation conditions.
Figure 5B:
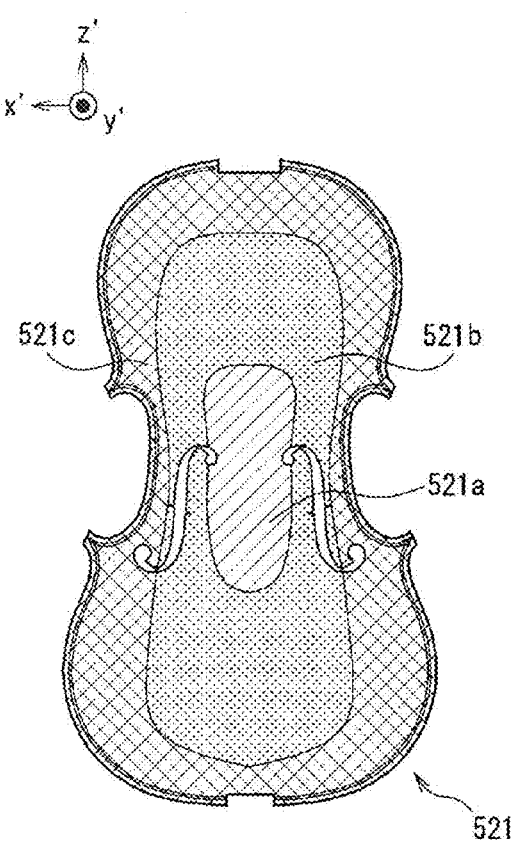

FIGS. 5(*a*) and 5(*b*) are explanatory views illustrating an example manufacturing the top plate portion of the violin by using plural laser irradiation conditions. FIG. 5(*a*) is the explanatory view when two kinds of laser irradiation conditions are used. FIG. 5(*b*) is the explanatory view when three kinds of laser irradiation conditions are used.

FIG. 5(*a*) illustrates that a top plate portion 511 integrally including the purfling is divided into approximately symmetrical two parts, and the top plate portion 511 is integrally manufactured by selectively changing the laser irradiation conditions respectively to a part 511*a* (for example, the three-dimensional desired area) manufactured under the laser irradiation condition A and a part 511*b* (the three-dimensional adjacent area in the above-stated example) manufactured under the laser irradiation condition B by using the contact bonding method. As a result, it is designed that the vibrational characteristics of the stringed instrument of the present invention are adjusted, to adjust the performances (sound volume, acoustic quality, and acousmato) of the instrument.

FIG. 5(*b*) illustrates that a top plate portion 521 integrally including the purfling is divided into three parts, and the top plate portion 521 is integrally manufactured by selectively changing the laser irradiation conditions respectively to a part 521*a* (for example, a desired area) manufactured under the laser irradiation condition A, a part 521*b* (an adjacent area relative to the desired area 521*a*) manufactured under the laser irradiation condition B, and a part 521*c* (an adjacent area when the adjacent area 521*b* is set as the desired area) manufactured under the laser irradiation condition C of which detailed description is not given in the present description. As a result, it is designed that the vibrational characteristics of the stringed instrument of the present invention are adjusted, to adjust the performances (sound volume, acoustic quality, and acousmato) of the instrument.

Here, an example in which the top plate portion 521 integrally including the purfling is integrally manufactured by applying the overlap bonding method using the two kinds of laser irradiation conditions described by using FIG. 1(*c*) is described by using FIG. 5(*b*). The top plate portion 521 is divided into three parts, and the top plate portion 521 is integrally manufactured while selectively changing the laser irradiation conditions respectively to the part 521*a* manufactured under the laser irradiation condition A, the part 521*c* manufactured under the laser irradiation condition B, and the part 521*b* manufactured under overlapping the laser irradiation conditions A, B. As a result, it is designed that the vibrational characteristics of the stringed instrument of the present invention are adjusted, to adjust the performances (sound volume, acoustic quality, and acousmato) of the instrument.

Here, an example in which the top plate portion 521 integrally including the purfling is integrally manufactured by applying the overlap bonding method using the one kind of laser irradiation condition described by using FIG. 1(*c*) is described by using FIG. 5(*b*). The top plate portion 521 is divided into three parts, and the top plate portion 521 is integrally manufactured while selectively changing an order of the laser irradiation respectively to the parts 521*a*, 521*b* manufactured under the laser irradiation condition A, and the parts 521*b*, 521*c* manufactured under the laser irradiation condition A. The part 521*b* manufactured by the overlapping of the laser irradiation condition A becomes a laminated body of layers to which twice laser irradiations are performed, and therefore, the part 521*b* has the material constants different from that of the parts 521*a*, 521*c*. As a result, it is designed that the vibrational characteristics of the stringed instrument of the present invention are adjusted, to adjust the performances (sound volume, acoustic quality, and acousmato) of the instrument.

Third Embodiment

Figure 6:
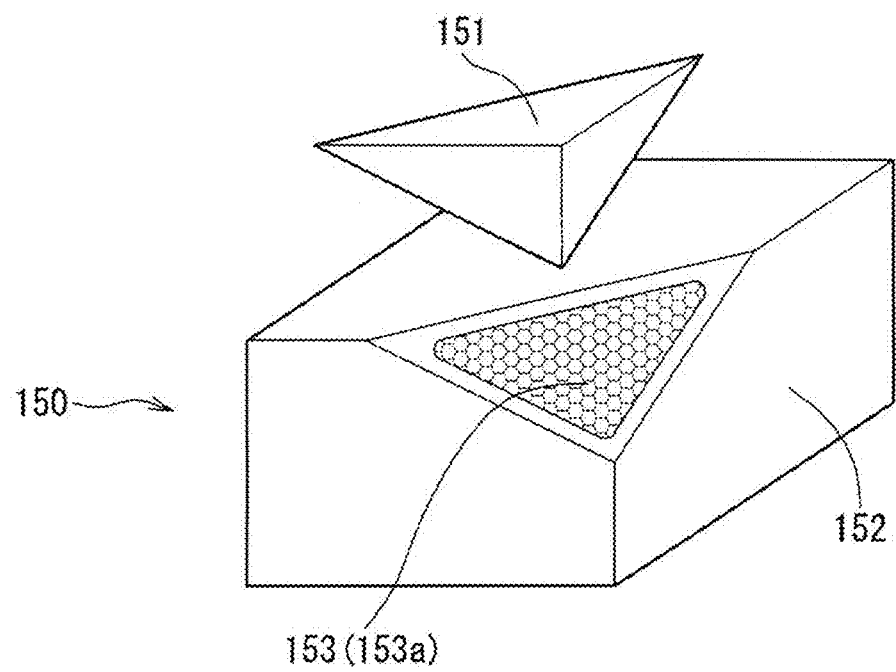
FIG. 6 is a schematic diagram of a three-dimensional structure capable of being manufactured by using an additive fabrication method, in which an outside contour portion is solidified, and raw material powder remains as it is in an (enclosed) space portion 153a inside thereof.

FIG. 6 is a schematic diagram of the three-dimensional structure in which an outside contour portion is solidified, and raw material powder remains as it is in an (enclosed) space portion 153*a* inside thereof, which is capable of being manufactured by using the additive fabrication method. To simplify the description, a rectangular solid three-dimensional structure 150 in FIG. 6 is represented under a state in which a corner portion 151 is tentatively cut, and the space portion 153*a* inside the rectangular solid three-dimensional structure 150 is illustrated. The additive fabrication method selectively sintering the raw material powder is a method in which a desired three-dimensional structure is manufactured by laminating each cross section of the three-dimensional structure to be manufactured one layer by one layer. Accordingly, it is possible to manufacture the three-dimensional structure under a state in which the outside contour portion 152 with thin thickness is solidified by sintering and raw material powder 153 (honeycomb hatching) is sealed in the space portion 153*a* inside the outside contour portion 152 as illustrated in FIG. 6. In the present invention, this method is called as a "powder containing sintering method".

When the method creating the three-dimensional structure in a state in which the outside contour portion with thin thickness is a solid and the raw material powder is remained inside the outside contour portion as it is applied to the present invention, for example, it is possible to partially weaken stiffness at an arbitrary position of the top plate portion, and to lower a specific gravity (density) without sacrificing an external appearance of the stringed instrument of the present invention. As a result, it is possible to change the performances (particularly the vibrational characteristics) of the stringed instrument of the present invention by using the powder containing sintering method. Besides, a bulk, density of the raw material powder is obviously small if it is compared to the density of the sintered three-dimensional structure, and therefore, it is possible to reduce the weight of the stringed instrument of the present invention by using the powder containing sintering method. As a result, there also is an effect to reduce tiredness of the player resulting from the performance for a long time. In addition, it is also possible to further reduce the weight of the stringed instrument of the present invention by removing the powder by boring a hole at a part of the sintered outside contour portion of a position where the raw material powder remains as it is inside the outside contour portion.

Fourth Embodiment

Here, a manufacturing method of a stringed instrument (violin) according to the present embodiment (hereinafter, referred to as a "present manufacturing method" when appropriate) is described. As it is described before, the violin 1 is the one including the resonance box portion 2 integrally fabricated by the additive fabrication method, and the neck portion 3 protruding from the resonance box portion 2. Here, the present manufacturing method is performed by three processes of a resonance box portion fabrication process fabricating the resonance box portion, a neck portion manufacturing process manufacturing the neck portion, and a neck portion attaching process attaching the neck portion to the resonance box portion. In the resonance box fabrication process, the resonance box portion is fabricated while making the material constants at the desired area different from the material constants at the adjacent area adjacent to the desired area step by step or continuously. In the neck portion manufacturing process, the neck portion is fabricated while making the material constants at the desired area different from the material constants at the adjacent area adjacent to the desired area step by step or continuously. Finally, in the neck portion attaching process, the neck portion fabricated in the neck portion manufacturing process is attached to the resonance box portion fabricated by the resonance box portion fabrication process. Hereinafter, the present manufacturing method is described in detail at a new section.

Figure 7A:
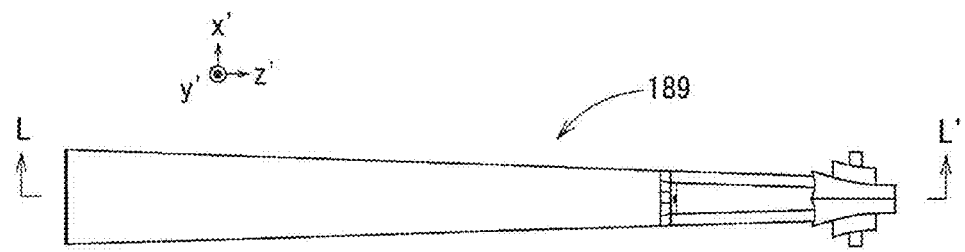
FIGS. 7(a) to 7(d) are explanatory views illustrating an example of a manufacturing method of a neck portion constituting a part of the present manufacturing method.
Figure 7B:
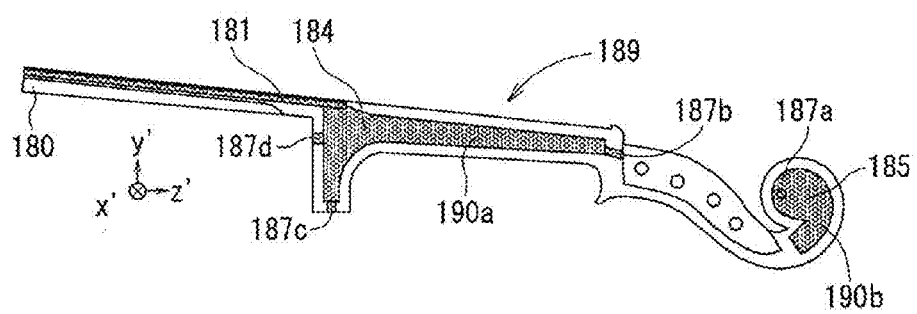
Figure 7C:
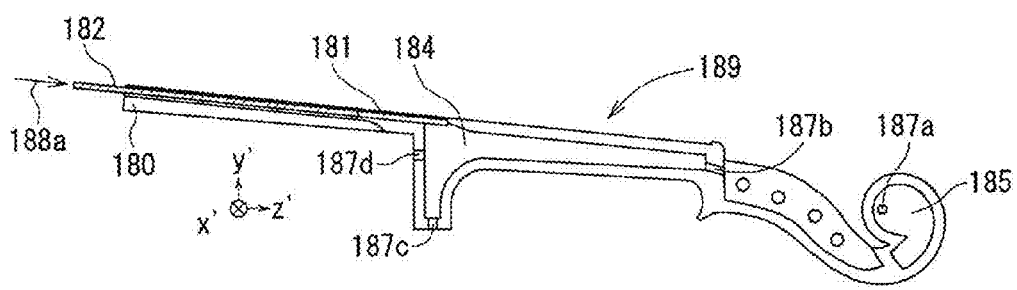
Figure 7D:
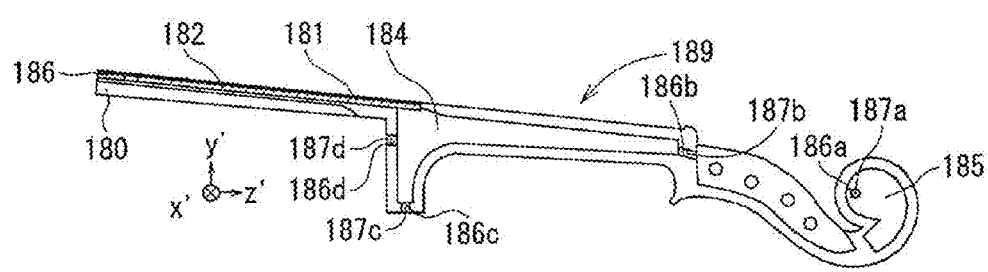

FIGS. 7(a) to 7(d) are explanatory views illustrating an example of the manufacturing method of the neck portion constituting a part of the present manufacturing method. FIG. 7(a) is a front view. FIGS. 7(b), 7(c), 7(d) respectively are L-L' sectional views of a neck portion 189 illustrated in FIG. 7(a), and they are arranged in an order of (b), (c), (d) according to the manufacturing process.

In case of the stringed instrument of the present invention, there is a possibility in which enough stiffness at a portion where the stiffness is required in particular such as the fingerboard cannot be secured depending on selected powder material and manufacturing conditions sintering and solidifying the powder, and this becomes the problem. As illustrated in FIGS. 7(a) to 7(d), an insertion hole 181 is bored in an approximately length direction (approximately the z' direction, the longitudinal direction) of a fingerboard 180 at the manufacturing time by an additive fabrication apparatus, and a bar (reinforcing member) 182 for reinforcement made of metal and so on may be pressed into the insertion hole 181 to reinforce. Here, the reinforcing member 182 is disposed inside the neck portion 189, but a reinforcing member (not-illustrated) may be disposed at outside of the neck portion 189 instead of the above, or together with the above.

FIG. 7(b) is the L-L' sectional view of the neck portion of the stringed instrument of the present invention. The neck portion 189 illustrated in FIG. 7(a) is the one formed by the additive fabrication method forming it by selectively sintering the powder while using the powder as the raw material. It is possible to manufacture the three-dimensional structure under a state including spaces such as space portions 184, 185 by adding an instruction in advance to include the space portions to the data of the three-dimensional structure input to the additive fabrication apparatus (the present fabrication apparatus) in the present embodiment using the additive fabrication method. In FIG. 7(b), a state is illustrated in which the neck portion 189 is took out of a removal chamber (a box chamber where the three-dimensional structure is formed) of the additive fabrication apparatus, and the material powder adhered on a surface in appearance is removed. Material powders 190a, 190b (honeycomb hatching) are still filled in the space portions 184, 185 and the insertion holes 181, 187a, 187b, 187c, and 187d. The raw material powders 190a, 190b (honeycomb hatching) filled in the space portions 184, 185, and the insertion holes 181, 187a, 187b, 187c, and 187d are removed from the insertion holes 181, 187a, 187b, 187c, and 187d (there is a case when these holes are called as "discharge holes") of which cross section is in a circle state by means of blowing of compressed air, a glass bead blast process, scraping off of the material powder by a fine wiriness metal tool or the like, water washing, and so on, and thereby, the neck portion 189 including the space portions 184, 185 is obtained. A reason to let the neck portion include the space portions is to reduce the weight of the stringed instrument of the present invention. Note that the discharge holes 181, 187a, 187b, 187c, and 187d after the material powders are discharged may be stayed open, but they may be closed by a closing member (for example, a fitting member fitting to the hole and an adhesive). It is possible to keep external beauty and to prevent that dust and so on may enter into the space portions by the closure. Note that it is also possible to form the resonance box portion 2 including the space portion by the similar method as described above.

Particularly a violin and a viola among the violin family are generally played by placing and holding the instrument between a chin and a shoulder. At this time, a left hand becomes a state subsidiary supporting the neck, but the left hand has an important role to play music by pressing strings with fingers to adjust a scale. Therefore, the instrument is held by the left hand just subsidiary, and mainly held by being placed between the chin and the shoulder actually. Accordingly, weight reduction of the neck portion has a large effect in the weight reduction for the user giving the performance, and the user sensuously feels that the instrument is light. As a result, there is an effect to reduce the tiredness of the user caused by the performance for a long time. It is also desirable for a cello and a contrabass among the violin family to reduce the weight in consideration of operability at the performance time because the user leans the instrument at the performance time and the instrument is supported by a whole body of the user to get ready. It goes without saying that the reduction in weight is desirable as all over the violin family in consideration of portability thereof. When the three-dimensional structure is manufactured by the additive fabrication method, it is general that a data (STL format and so on) of a desired three-dimensional structure is created by using the three-dimensional CAD, a three-dimensional data editing software, and so on. There is software among these three-dimensional CAD, the three-dimensional data editing software, and so on mounting a function to calculate and display a volume, a surface area, and a gravity center position of the created three-dimensional structure data. For example, if SolidWorks (trademark) is used as the three-dimensional CAD for the three-dimensional structure data creation in the present invention, a function to calculate and display a weight by inputting the density of the material is also included in addition to the function to calculate and display the volume, the surface area, and the gravity center position of the three-dimensional structure data, and therefore, it is possible to grasp a rough weight of the stringed instrument at a design stage before the stringed instrument of the present invention is manufactured.

Incidentally, if the stringed instrument of the present invention is partially made hollow more than is necessary including that the neck portion and the resonance box portion are made hollow, there are possibilities that strength of the instrument of the present invention is significantly lowered, and the performances (sound volume, acoustic quality, acousmato) of the instrument and the operability at the performance time are significantly deteriorated depending on circumstances. A design method of the instrument including that the stringed instrument of the present invention is partially made hollow is described in detail at a later-described section of the design method of the stringed instrument.

Besides, it is possible to reuse (recycle) the removed raw material powder at a manufacturing process of the next additive fabrication method in some cases, and therefore, it is desirable to make it hollow from a point of view of cost cutting of the raw material.

FIG. 7(c) is the L-L' sectional view illustrating an example in which the reinforcing member 182 is inserted into the insertion hole 181 bored at the fingerboard 180 of the neck portion 189 of the stringed instrument including the space portions 184, 185 described by using FIG. 7(b).

In the violin family, the strings are generally pinched between the left hand fingers and the fingerboard to thereby change vibrational frequency of the strings to play the music. At this time, when it is played at a high frequency sound range by taking advantage of position shift of the left hand of the user, it is impossible to play music with correct interval if the stiffness of the fingerboard is low to thereby bend when the strings are pinched between the finger and the fingerboard.

For example, there is a case in the present invention when shortage of stiffness of the fingerboard occurs in case of the stringed instruments such as the cello and the contrabass including a relatively long fingerboard, but the problem of the shortage of stiffness of the fingerboard is solved by using the method of the fourth embodiment. It is possible to include the insertion hole 181 to which the reinforcing member 182 of the fingerboard is inserted as illustrated in FIGS. 7(b), 7(c), 7(d) without requiring a large process by giving an instruction to bore a long hole in the longitudinal direction of the fingerboard to the three-dimensional structure data input to the additive fabrication apparatus in advance by using the additive fabrication method.

As illustrated in FIG. 7(c), the reinforcing member 182 of which length is shorter than the length of the insertion hole 181 bored at the fingerboard 180 and of which cross section is a circle, and of which diameter has a plus tolerance relative to a diameter of the insertion hole 181 is prepared, and the reinforcing member 182 is inserted into the insertion hole 181. At this time, the reinforcing member 182 is fixed inside the insertion hole 181 after this work is finished if the diameter of the reinforcing member 182 has the plus tolerance relative to the diameter of the insertion hole 181. In this case, an end portion of the reinforcing member 182 is hit with a plastic hummer or the like in an arrow 188a direction to press the reinforcing member 182.

The holes to insert the reinforcing members 182 may be prepared in plural, and the reinforcing members 182 for the holes may be prepared in plural. The cross-sectional shapes of the reinforcing member 182 and the hole to insert the reinforcing member 182 may not be a circle but a polygon as long as it is possible to compensate the shortage of stiffness of the fingerboard 180. Besides, the reinforcing member 182 may be replaced by a hollow pipe from a point of view of the reduction in weight as long as the reinforcement of the fingerboard 180 can be enough enabled. Further, the reinforcing member 182 is not necessarily made of metal in particular as long as the reinforcement of the fingerboard 180 can be enough enabled though it is desirable to be made of metal (for example, SUS304 and so on). It is useful from points of views of the reinforcement and the reduction in weight of the fingerboard if a raw material of the reinforcing member 182 and the hollow pipe is the material of which density is lower than the metal, toughness is high, and elastic constant (Young's modulus and so on) is large.

FIG. 7(d) is the L-L' sectional view illustrating an example in which the insertion holes 181, 187a, 187b, 187c, and 187d of the neck portion 189 of the stringed instrument including the space portions 184, 185 and having stiffness enhanced by inserting the reinforcing member 182 to the fingerboard 180 described by using FIG. 7(c) are closed.

The insertion holes 181, 187a, 187b, 187c, and 187d are still opened at the neck portion 189 just after the work described by using FIG. 7(c) is finished, and there is a problem in an external appearance thereof. As illustrated in FIG. 7(d), closing members 186, 186a, 186b, 186c, and 186d of which diameters include the plus tolerances than the diameters of the insertion holes 181, 187a, 187b, 187c, and 187d are manufactured with the same material as the neck portion 189 by using the additive fabrication method in addition to the neck portion 189, and these closing members 186, 186a, 186b, 186c, and 186d are hit with the plastic hummer and so on to press into the respectively corresponding insertion holes 181, 187a, 187b, 187c, and 187d. The closing members 186, 186a, 186b, 186c, and 186d are pressed into the insertion holes 181, 187a, 187b, 187c, and 187d for a degree just a little protruding from a surface of the neck portion 189 to which the holes are bored. The parts of the closing members 186, 186a, 186b, 186c, and 186d protruding from the surface of the neck portion 189 are cut by using a cutter and so on to be aligned with the surface of the neck portion 189, the surfaces thereof are smoothly maintained to be finished in accordance with the surface of the neck portion 189 by using an abrasive paper, and thereby, it is possible to close the insertion holes 181, 187a, 187b, 187c, and 187d without any outstanding problems from the point of view of the external appearance in general.

As stated above, it is described that the diameter of the reinforcing member 182 relative to the diameter of the insertion hole 181 includes the plus tolerance, further the diameters of the closing members 186, 186a, 186b, 186c, and 186d closing the insertion holes 181, 187a, 187b, 187c, and 187d also include the plus tolerances relative to the diameters of the respectively corresponding insertion holes 181, 187a, 187b, 187c, and 187d, and they are hit to be pressed with the plastic hummer and so on in the description of the fourth embodiment. However, a tolerance of "0" (zero) or a minus tolerance may be given to the diameters of the reinforcing member 182 and the closing members 186, 186a, 186b, 186c, and 186d respectively corresponding to the diameters of the insertion holes 181, 187a, 187b, 187c, and 187d, and they may be fixed by using adhesive after they are inserted into the insertion holes 181, 187a, 187b, 187c, and 187d respectively. Further, as another example of this method, there also is a method in which the closing members are welded to be fixed after the closing members 186, 186a, 186b, 186c, and 186d are respectively inserted into the insertion holes 181, 187a, 187b, 187c, and 187d in case of the closing members closing the holes. Of course, there is a case when it is necessary to finish the surface of the neck portion 189 smoothly so that the problem in the external appearance does not exist by maintaining the insertion portions of the closing members by using the abrasive paper and so on according to need if either case of the fixing by the usage of adhesive or the fixing by the welding is applied.

Fifth Embodiment

Figure 8A:
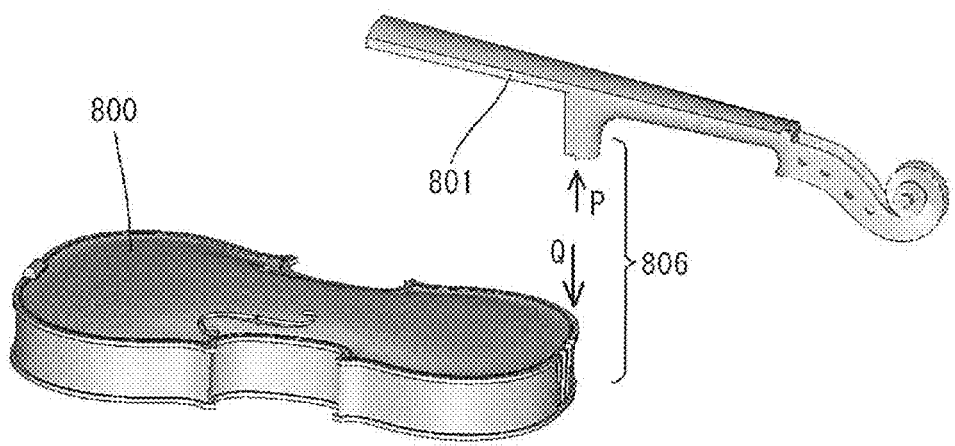
FIGS. 8(a) to 8(d) are explanatory views illustrating an example obtaining an instrument main body by assembling the neck portion and the resonance box portion separately manufactured by the additive fabrication method.
Figure 8B:
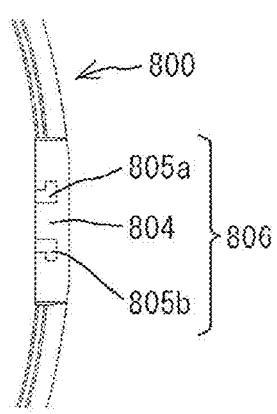
Figure 8C:
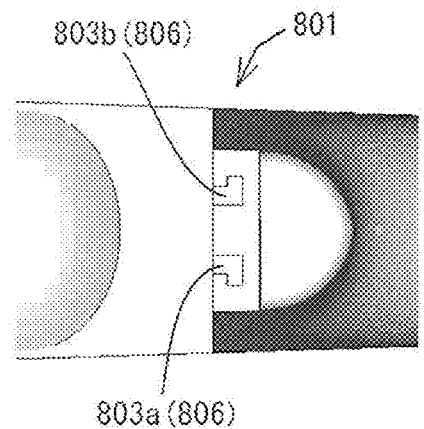
Figure 8D:
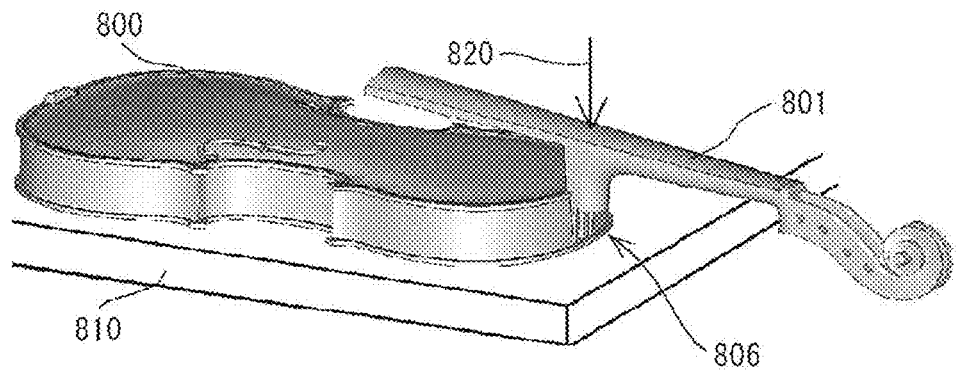

Generally, the neck and the resonance box portion are bonded by using adhesive such as glue when the conventional wooden violin is manufactured. In the fifth embodiment, a method is described in which the instrument main body is obtained by assembling the neck and the resonance box portion without using any adhesive as an example of the embodiments of the present invention. FIGS. 8(a) to 8(d) are explanatory views illustrating an example obtaining the instrument main body by assembling the neck portion and the resonance box portion separately manufactured by the additive fabrication method. FIG. 8(a) is a perspective view of a separately manufactured resonance box portion 800 and a neck portion 801 of an instrument of the present invention. FIG. 8(b) is a detail view of a combined portion 806 formed between the resonance box portion 800 and the neck portion 801 illustrated in FIG. 8(a) when it is viewed in a direction of arrow Q. FIG. 8(c) is a detail view when the combined portion 806 illustrated in FIG. 8(a) is viewed in a direction of arrow P. FIG. 8(d) is a perspective view explaining that the resonance box portion 800 and the neck portion 801 are assembled.

As illustrated in FIG. 8(b), a combined groove 804 constituting one side of the combined portion 806 and combining projecting portions 805a, 805b in approximately L-shape in a plan view projecting in an outside direction (a right direction in FIG. 8(b)) from both sides of the combined groove 804 are provided at an end portion of the resonance box portion 800. On the other hand, as illustrated in FIG. 8(c), combining recessed portions 803a, 803b constituting the other side of the combined portion 806 are provided at portions corresponding to the combined groove 804 and so on of the neck portion 801. Each of the combining projecting portions 805a, 805b are pressed into each of the combining recessed portions 803a, 803b in the arrow Q direction in FIG. 8(a) so as not to fall out easily. This falling out prevention maintains a state in which the neck portion 801 is fixed to the resonance box portion 800. On the other hand, it is also possible to detach the neck portion 801 from the resonance box portion 800 by adding a force in a reverse direction (the arrow P direction in FIG. 8(a)) from the pressing direction. Namely, the neck portion 801 is attachable/detachable relative to the resonance box portion 800 owing to the function of the combined portion 806. It is not prevented that the adhesive and so on to prevent from falling out is coated on the combined portion 806, but it is preferable to coat the adhesive and so on so as not to give a negative effect on the attaching and detaching capability.

When the additive fabrication method in which the three-dimensional structure is formed by performing the selective sintering while using the powder as the raw material, it is possible to form the combined groove 804 and the combining projecting portions 805a, 805b at the resonance box portion 800 at the fabrication time, and to similarly form the combining recessed portions 803a, 803b of the neck portion 801 at the fabrication time.

As illustrated in FIG. 8(d), when the neck portion 801 and the resonance box portion 800 are assembled, the resonance box portion 800 is put on a firm workbench 810, the neck portion 801 is disposed at a position where the combining projecting portions 805a, 805b are respectively pressed into the combining recessed portions 803a, 803b, and the fingerboard of the neck portion 801 is hit with the plastic hummer in a direction of an arrow 820 to be pressed.

Sixth Embodiment

In examples of the present invention described hereinabove, it is described as a major example when the additive fabrication method forming the three-dimensional structure by means of laser sintering while using the powder as the raw material is used. However, there are plural kinds of additive fabrication methods other than the above-stated additive fabrication method. It is possible to implement the present invention when these additive fabrication methods are used. An example thereof is described below.

As one of the additive fabrication methods, there is a method in which a liquid state (including a semi-liquid state of which viscosity is relatively large) raw material (for example, a synthetic resin) which is solidified by irradiating light such as ultraviolet ray is used as the raw material of the three-dimensional structure. In detail, it is a method in which a process in which the liquid state raw material being the raw material is supplied by each layer in accordance with a cross-sectional shape data of a desired three-dimensional structure, and the light such as the ultraviolet ray is irradiated simultaneously with the above to thereby solidify the liquid state raw material is repeated, and thereby, resin layers are laminated. The method as stated above is sometimes called as a deposition method in an Ink-Jet system. It is possible to supply the liquid state raw material by using, for example, an injection head having approximately a similar structure as an ink injection head held by an ink jet printer widely used in general. There is an apparatus called as a 3D printer of which apparatus scale is relatively small in an additive fabrication apparatus applying the additive fabrication method as stated above. Further, there is an apparatus including plural storage tanks (including a cartridge type storage tank) to store plural kinds of liquid state raw materials among the additive fabrication apparatus applying this system. This additive fabrication apparatus includes a function in which the liquid state raw materials separately stored are taken out of the plural storage tanks with a specified volume ratio, these are sprayed and injected in accordance with the cross-sectional shape of the desired three-dimensional structure almost simultaneously, and thereby, the additive fabrication is performed while approximately mixing the plural liquid state raw materials when a broad view is taken in a fabrication process forming the desired three-dimensional structure.

For example, in the additive fabrication apparatus mounting two storage tanks, a case is considered in which a liquid state raw material $L_1$ which becomes a hard synthetic resin of which hardness is relatively high and a liquid state raw material $L_2$ which becomes a flexible synthetic resin of which hardness is relatively low when they are solidified by irradiating the light such as the ultraviolet ray are separately stored in each storage tank. In the fabrication process when the desired three-dimensional structure is formed by using the additive fabrication apparatus, the three-dimensional structure having peculiar mechanical properties (for example, the elastic constant and the density) including the vibrational characteristics derived from the respective liquid state raw materials $L_1$, $L_2$ is formed when the liquid state raw materials $L_1$, $L_2$ are respectively taken out one by one to be injected, and the three-dimensional structure is additively fabricated by irradiating the light such as the ultraviolet ray to solidify them. On the other hand, the three-dimensional structure having the mechanical properties different from the case when the above-stated liquid state raw materials are respectively taken out one by one is formed when the three-dimensional structure is manufactured by repeating a process in which the liquid state raw materials $L_1$, $L_2$ are taken out with an arbitrary ratio (for example, with the ratios of 2.5:7.5, 5:5, 9:1 and so on when a required amount is set to be 10), they are almost simultaneously injected in accordance with the cross-sectional shape of the desired three-dimensional structure, and they are solidified by irradiating the ultraviolet ray and so on. Concretely speaking, the three-dimensional structure having almost intermediate mechanical properties (the elastic constant, the density, and so on) derived from the liquid state raw material $L_1$ and the liquid state raw material $L_2$ is obtained. Besides, a relatively violent chemical reaction occurs depending, on a chemical compatibility between the liquid state raw material $L_1$ and the liquid state raw material $L_2$, and the three-dimensional structure having the mechanical properties totally different from the mechanical properties derived from the liquid state raw material. $L_1$ and the liquid state raw material $L_2$ is obtained.

Besides, it is possible to further diversify the material constants (the elastic constant, the density, and so on) of the three-dimensional structure in formed as a result by using a component other than the main, material (for example, the synthetic resin) to be mixed to the above-stated liquid state raw material. The component other than the main material is, for example, a minute particle of matter such as metal powder, glass bead, and so on. It is possible to further diversify variations such as the performances of the stringed instrument of the present invention and the adjustment of the operability at the performance time by manufacturing the stringed instrument by the method as stated above.

It is possible to manufacture the stringed instrument similar to the case when the contact bonding method effected in the additive fabrication method in which the raw material powder is sintered by the irradiation of light described in the first embodiment or the second embodiment is applied when the stringed instrument is manufactured by the additive fabrication method using the plural liquid state raw materials as stated above. Concretely speaking, for example, each of the top plate portion and the back plate portion, each of the neck portion and the resonance box portion, or the whole of the instrument main body are divided in plural into the desired area and the adjacent area as stated above, and it is possible to integrally form the instrument while making the material constants at the desired area and the adjacent area adjacent thereto different step by step or continuously. The effects thereof are almost the same as the effects described in the first embodiment and the second embodiment. Note that when the stringed instrument of the present invention is manufactured by the additive fabrication method using the plural liquid state raw materials and the desired area or the adjacent area is formed, and when for example, the additive fabrication apparatus applying the additive fabrication method using the liquid state raw materials stores the liquid state raw materials $L_1$, $L_2$ in the two storage tanks respectively, it is included in a range of a condition change and a range of a condition change control in manufacturing the stringed instrument of the present invention, in which the liquid state raw materials $L_1$, $L_2$ are taken out while setting the mixture ratio of the liquid state raw materials at 10:0 (when the required amount is set to be 10), or 0:10 (when the required amount is set to be 10), they are injected in accordance with the cross-sectional shape of the desired three-dimensional structure, then they are fabricated by solidification by irradiating the ultraviolet ray and so on to form the desired area or the adjacent area.

Besides, when the stringed instrument of the present invention is manufactured by the additive fabrication method using the plural liquid state raw materials, it is possible to manufacture the three-dimensional structure similar to the three-dimensional structure manufactured by using the powder containing sintering method described in the above-stated third embodiment. Note that the raw material powder which is chemically almost the same as the three-dimensional structure obtained as a result of the sintering is contained (filled) in the space portion enclosed by the outside contour portion formed by sintering in the powder containing sintering method, on the contrary, the three-dimensional structure manufactured by the additive fabrication method using the plural liquid state raw materials is formed under a state in which a support of which material is completely different from the desired three-dimensional structure is contained (filled) at the whole or a part of the enclosed space. The support described here means a temporary support structure which is formed (fabricated by solidification) almost in parallel with the formation of the desired three-dimensional structure during the fabrication process at a part to be almost a shadow of the desired three-dimensional structure (generally, a part which cannot be seen) mainly formed at the fabrication process completion time when, for example, it is looked down from a plus z direction (vertex direction) toward a minus z direction to manufacture the desired three-dimensional structure stably in the solidification fabrication process of the additive fabrication method using the plural liquid state raw materials. It is often the case that the material to form the support (support material) is a liquid state synthetic resin which is solidified by irradiating the ultraviolet ray and so on as same as the liquid state raw materials $L_1$, $L_2$. The support material is stored in a storage tank (including a cartridge type storage tank) dedicated for the support material further prepared inside the additive fabrication apparatus in addition to the storage tanks for the liquid state raw materials $L_1$, $L_2$. This stored support material becomes the raw material forming the support by appropriately taken out at the support manufacturing time in the fabrication process. The support formed by using the support material as the raw material is preferable to be a water soluble or alkaline liquid soluble material. In general, it is often the case that the support is removed from the desired three-dimensional structure after the fabrication process is finished. It is possible to perform the removal of the support by means of washing by water, alkaline liquid (alkaline dissolved liquid capable of removing support) and so on, a blowing removal by water jet, or a scraping out, a rubbing off by a tool in wiriness, and so on. It is often the case that the mechanical properties of the material constituting the support are different from that of the desired three-dimensional structure, and therefore, it is often the case that the mechanical properties (including the vibrational characteristics, the weight, and so on) are obviously different when the support is filled in the almost enclosed space portion of the desired three-dimensional structure compared to the case when the three-dimensional structure having the same shape in external appearance and manufactured by the same apparatus without the enclosed space. For example, it is possible to adjust the performances (sound volume, acoustic quality, and acousmato) of the stringed instrument of the present invention as a result of providing the enclosed space portion (in which the support is filled) at the neck portion and the resonance box portion. It goes without saying that it is possible to further reduce the weight of the stringed instrument of the present invention by removing the support by boring a hole at a part of the outside contour portion at the portion where the support remains inside the outside contour portion (inside the enclosed space, the space portion). Effects thereof are almost the same as the effects described in the third embodiment.

Further, it is possible to manufacture the neck portion 189 as the three-dimensional structure having the space portions 184, 185 and the insertion holes 181, 187*a*, 187*b*, 187*c*, and 187*d* described in the above-stated fourth embodiment (refer to FIGS. 7(*a*) to 7(*d*)) by the additive fabrication method using the plural liquid state raw materials. Incidentally, it is often the case that the neck portion 189 just after the fabrication process is finished is in a state in which the support (the support is not the powder material in this case) is filled in the whole or a part of the space portions 184, 185, the insertion holes 181, 187*a*, 187*b*, 187*c*, and 187*d*, and so on, and therefore, it is necessary to remove the support by the above-stated methods (water washing or the like). It goes without saying that the reinforcement of the fingerboard 180 by the insertion of the reinforcing member 182, the closure of the insertion holes 181, 187a, 187b, 187c, and 187d by the closing members 186, 186a, 186b, 186c, and 186d may be performed if necessary as same as the description in the fourth embodiment. Effects are almost the same as the effects described in the fourth embodiment.

Further, it is possible to manufacture the neck portion 801 and the resonance box portion 800 having the combined portion 806 described in the fifth embodiment (refer to FIGS. 8(*a*) to 8(*d*)), and to obtain the instrument main body of the stringed instrument by assembling the neck portion and the resonance box portion without using any adhesive as for the assembling similarly by the additive fabrication method using the plural liquid state raw materials. Effects are almost the same as the effects described in the fifth embodiment.

The three-dimensional structure manufactured by the additive fabrication method using the plural liquid state raw materials also has a lamination structure, and has anisotropy derived from the lamination structure. In more detail, the three-dimensional structure manufactured by the additive fabrication method using the plural liquid state raw materials represents the anisotropy in accordance with the xyz axis coordinate system of which z direction is the lamination direction as same as the three-dimensional structure manufactured by the additive fabrication method sintering the raw material powder by the light irradiation described by using FIG. 2. In the three-dimensional structure manufactured by the additive fabrication method using the plural liquid state raw materials, it is possible to change the mechanical properties including the vibrational characteristics (for example, the natural resonance frequency, the vibrational mode, and the vibrational amplitude) by changing the fabrication direction (angles $\phi$, $\theta$, $\omega$) as same as the case when it is described as an example of the additive fabrication method sintering the raw material powder by the light irradiation. Namely, in the desired three-dimensional structure, the fabrication direction (angles $\phi$, $\theta$, $\omega$) is changed, and thereby, it is applied to the x'y'z' axis coordinate system. Accordingly, when the additive fabrication method using the plural liquid state raw materials is used for the manufacturing of the stringed instrument of the present invention, it is possible to apply the design method described in the later-described design method of the stringed instrument. Besides, the manufacturing of the three-dimensional structure by the additive fabrication method using the plural liquid state raw materials is applicable for a secondary effect of the later-described design method of the stringed instrument.

Besides, a concept to individually manufacture the stringed instrument of the present invention by each single piece or plural pieces of constituting portion described by using FIGS. 3(*a*) to 3(*c*) is applied while combining, for example, the additive fabrication method using the plural liquid state raw materials and the additive fabrication method in which the three-dimensional structure is formed by selectively sintering the powder as the raw material by the irradiation of the light such as laser. As a result, a design range (adjustment range) of the stringed instrument of the present invention is expanded as described below. Namely, for example, the semiresonance box 100 is manufactured by the additive fabrication method forming the three-dimensional structure by selectively sintering the powder as the raw material by the irradiation of light such as laser, and the remaining top plate portion 101 integrally including the purfling, the bass bar 102, the saddle 103, the neck 104 (integrally including the scroll and the pegbox), the fingerboard 105, and the nut 106 are manufactured by the additive fabrication method using the plural liquid state raw materials. Accordingly, the instrument main body of the stringed instrument of the present invention can be assembled by the adhesion, the welding, the fitting by the pressing, and so on. The design range (adjustment range) of the stringed instrument of the present invention is thereby expanded. It goes without saying that the method may be applied in which these constituting portions are respectively divided in plural into the desired area and the adjacent area, and are integrally formed such that the material constants (the elastic constant and the density) of the desired area and the adjacent area adjacent thereto are made different step by step or continuously in accordance with the respective additive fabrication methods. As a result, flexibility of the design (adjustment) of the stringed instrument of the present invention becomes larger compared to the case when the stringed instrument is manufactured by applying a single additive fabrication method. In detail, it is possible to minutely adjust the operability at the performance time in addition that the adjustment range of the performances (sound volume, acoustic quality, and acousmato) of the instrument is expanded. Namely, it is often the case that there are differences in the adjustment range (the fabrication direction is one of adjustment parameters) of the material constants (elastic constant, density, and so on) of the three-dimensional structure obtained as a result of the fabrication, an abrasion resistance, aging characteristics, touch of the surface, and so on because of a characteristic principle (process method) applied by each method, a difference of the raw material of the three-dimensional structure applied thereto, and a specification of the additive fabrication apparatus (including the scale thereof), and so on. Accordingly, it is possible to manufacture the stringed instrument which approximates to the user's ideal because a synergistic effect of advantages of the respective additive fabrication methods (or an effect supplementing defects of the respective additive fabrication methods) is obtained, by manufacturing the stringed instrument of the present invention by appropriately combining the plural kinds of additive fabrication methods having respective characteristics.

As one of merits of manufacturing the stringed instrument by using the above-described additive fabrication method, it can be cited that, for example, it is possible to intentionally adjust the material constants (elastic constant, density, and so on) of the whole or by each part of the instrument main body, and to form the instrument main body integrally or separately while intending to adjust the performances (sound volume, acoustic quality, and acousmato) of the instrument which is different from the conventional method in which the stringed instrument is manufactured by heavily using woods obtained from trees brought up for a long period of time (more than several decades), and while partly leaving the growth to the nature. Besides, as another merit of manufacturing the stringed instrument by using the additive fabrication method, it can also be cited that, a quality management of a product is easy to perform because repeatability of the material constants is generally secured more than the wood by appropriately managing the used additive fabrication apparatus, the manufacturing process, and so on. Namely, it means that it is possible to stably provide many stringed instruments to the users. For example, it is possible that plural pieces of the instrument main bodies or plural sets of respective constituting portions to be the instrument main bodies after they are assembled of not only a violin in a standard size (4/4 size) used by adults but also a fractional violin (small sized violins such as $\frac{1}{16}$, $\frac{1}{8}$, $\frac{1}{4}$, $\frac{1}{2}$) used by children in a growth process are manufactured within the same batch of the additive fabrication process depending on the scale of the used additive fabrication apparatus. It goes without saying that it is often the case that it is possible to quickly correspond to, for example, a single part production (custom-made production) satisfying a requirement of a certain individual in the manufacturing of the stringed instrument by the additive fabrication method compared to a case when the conventional wooden stringed instrument is manufactured from the beginning, and this is one of the merits.

(Design Method of Stringed Instrument)

In the present invention, it is possible to effectively and efficiently perform a design of stringed instruments including a violin family manufactured by using the additive fabrication method, by using a computer simulation system in which computer software for analysis executing an FEM (finite element method) and a BEM (boundary element method) including an FMBEM (fast multipole boundary element method).

Figure 9:
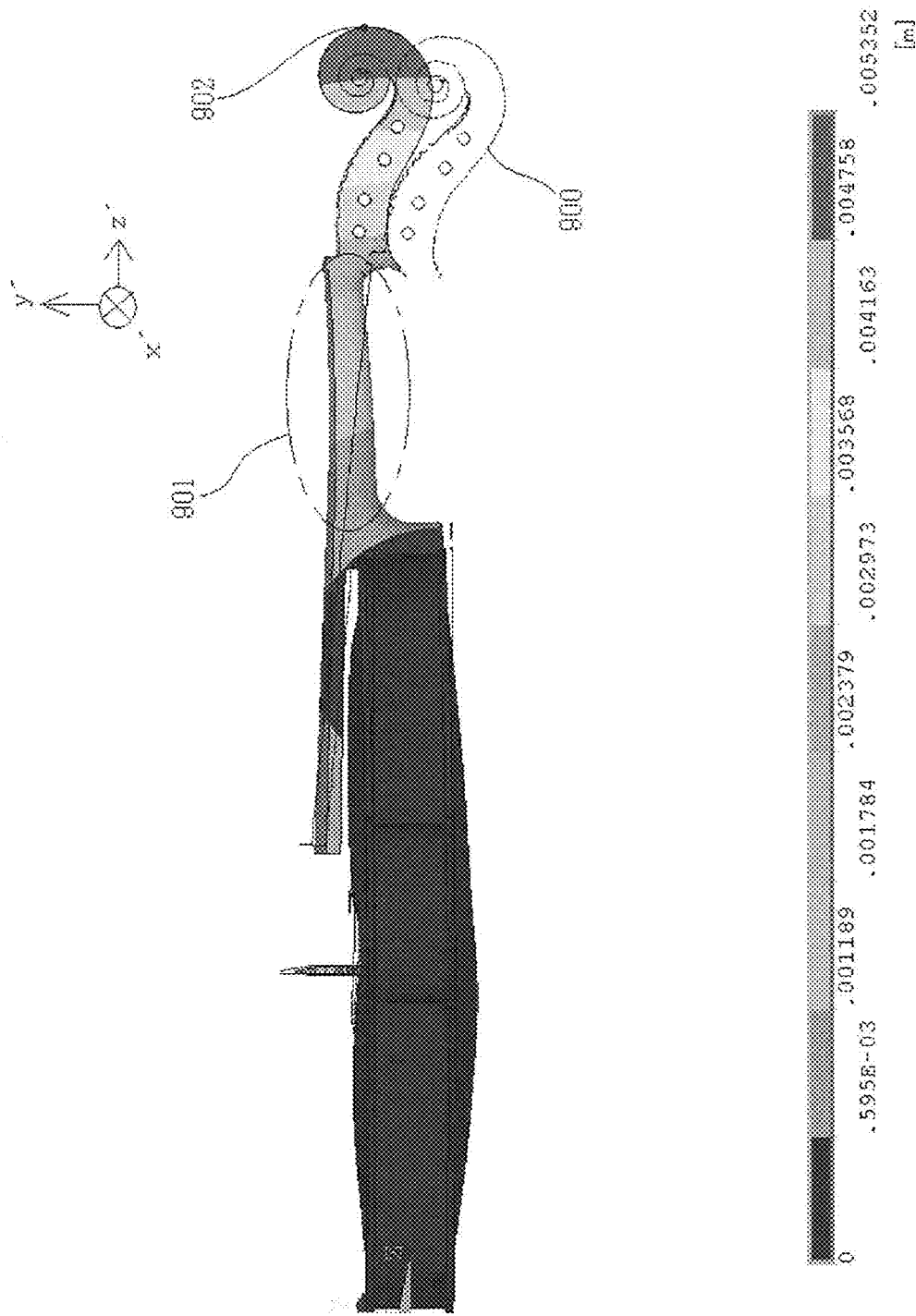

FIG. 9 is a gray scale (grays of which degrees of lightness are different are painted into several stages from white to black) representing a result in which a static structural analysis by the finite element method of the stringed instrument of the present invention is performed by using (importing) the three-dimensional structure data of the violin created by using the three-dimensional. CAD and so on. Note that an instrument main body including bars (two pieces) for reinforcement of a not-illustrated fingerboard, a bridge, a tailpiece other than a not-illustrated sound post, an adjuster, four pieces of strings, four pieces of pegs, an endpin, a chin rest, a shoulder rest, and so on among all of parts constituting a violin are not illustrated in simulation models of the stringed instruments (violin) illustrated in FIG. 9, FIG. 10, and FIG. 11 to simplify the explanation.

FIG. 9 illustrates, a distribution (USUM) of an x'y'z' synthetic displacement obtained as a result that the static structural analysis by the finite element method is performed on an assumption that an instrument main body is actually manufactured by using EOSINT P385 being the present manufacturing apparatus by visually changing lightness. A strip portion at a right end of a scale at downward of the drawing represents a part of which displacement is the largest, and sizes becomes sequentially smaller as it goes toward left side, and a strip portion at a left end represents a part of which displacement is the smallest. In the stringed instrument including the violin family, tuning is performed by tightening and loosening the strings. At this time, tension is generated at the string of the stringed instrument, and therefore, deformation, strain, stress are naturally generated at respective parts of the stringed instrument main body receiving the tension. There is a case when the deformation of the stringed instrument caused by tightening the strings may particularly have a great damaging effect on the operability of the instrument.

En case of the violin, a sum of the tension of the four strings is 68 pounds (1 pound is approximately 0.454 kg), and a load of total 26 pounds is added to the bridge according to the non-patent document 2. Of course, values of these loads may change depending on a maker, a material, a kind of the strings. In case of the violin family, the tension of the strings generated when the four strings are tightened and the load added to the bridge are received by almost the whole of the instrument, to be deformed to bend in an approximately y' direction (like a bow in a upper chord shape in FIG. 9). There is a case when there is a great damaging effect on the operability of the instrument if the deformation is large. Namely, in case of the violin family, the neck portion bends largely by tightening the four strings, then it becomes difficult to press the strings with the left hand fingers at the performance time because a distance between the strings and the fingerboard becomes large as a result of the bend, and it becomes difficult to play music with good interval. When the instrument of the present invention is designed, it is very useful to use the static structural analysis by the finite element method particularly when the neck portion is made hollow to reduce the weight as it is described in the fourth embodiment.

FIG. 9 represents the result in which the state of the stringed instrument of the present invention when the strings of the instrument main body are tightened is analyzed by using the static structural analysis by the finite element method. When this analysis is performed, at first, meshing is performed for the data of the three-dimensional structure created by the three-dimensional CAD and so on by using preprocess software so as to be applied to the finite element method. A data of a mesh element model obtained as a result of the above is read by finite element method software. Next, the material constants (elastic stiffness constants) are respectively defined by respective portions of the instrument and by respective parts of the instrument in the mesh element model read by the finite element method software. It goes without saying that the three-dimensional structure manufactured by the additive fabrication method has the anisotropy, and therefore, it is convenient when a difference of the analysis result caused by the difference of the angles $\phi$, $\theta$, $\omega$ is relatively compared, if the tensor transformation (transformation by using the above-stated numerical expressions (2) to (5) and so on) is performed for the elastic stiffness constant in accordance with angles $\phi$, $\theta$, $\omega$ to manufacture the three-dimensional structure particularly in consideration of the angles $\phi$, $\theta$, $\omega$ as stated above, and an elastic stiffness constant $[c'_{pq}]$ applied to the x'y'z' axis coordinate system after the transformation is defined by each portion of the instrument and by each parts of the instrument. It is also necessary to set the material constants for the reinforcing member similarly when the reinforcement by inserting the reinforcing member and so on into the fingerboard is applied. Note that when ANSYS (trademark) is used as the finite element method software, an elastic compliance constant may be used instead of the elastic stiffness constant. In case of an isotropy material, it is necessary to define a Young's modulus and a Poisson's ratio. In case of an orthotopic material, it is necessary to define the Young's modules, the Poisson's ratio and a modulus of rigidity by each of xyz directions.

Next, a loading condition and a fixing condition (mechanical restriction conditions) are set on an assumption when the strings are tightened on the instrument main body. In case of the violin, the analysis is performed by fixing (mechanically restricting) a fixing portion of the chin rest and an attaching portion of the shoulder rest in every analysis (static structural analysis, modal analysis, and frequency response analysis) described by using FIGS. 9, 10 because the instrument is held to get ready by placing the instrument between the chin and the shoulder via the chin rest and the shoulder rest at the performance time as for the fixing condition.

The gray scale illustrated in FIG. 9 makes an exaggerated display in which several times of magnification is intentionally multiplied to an actual displacement for easy to understanding. In FIG. 9, an appearance in which the instrument main body is totally deformed and the neck portion particularly bends largely can be seen under a tightened state (a state in which the load is added) relative to an outside contour portion line 900 before the load is added. In an actual analysis value, a displacement of a tip portion (point) 902 of the scroll in the z' direction toward the y' direction is approximately several mm. As stated above, the stringed instrument of the present invention is analyzed by using the static structural analysis by the finite element method, and thereby, it is possible to obtain a displacement amount of each part of the instrument main body when it is tightened before the stringed instrument is actually manufactured. A bending 901 of the neck portion generated by making the neck portion hollow to reduce the weight can be comprehensively analyzed. At first, it can be cited to add a rib to reinforce (change the cross-sectional shape of the neck portion) to the space portion contained in the three-dimensional structure data of the neck portion created by the three-dimensional CAD and so on as a design proposal on the assumption to make the neck portion hollow. Secondly, it can be cited that the three-dimensional structure data of the neck portion is created in a bending state so that the scroll of the neck portion is in a minus y' direction in a creation work of the data of the three-dimensional structure on the three-dimensional CAD in advance in consideration that the neck portion is bent because the strings are tightened, and the neck portion becomes almost straight when the strings are tightened. Thirdly, it can be cited to reinforce the neck by inserting the reinforcing member into the neck as illustrated in the fourth embodiment. Of course, the three-dimensional structure data of the neck portion created by applying the first idea, the second idea, the third idea, and so on becomes the three-dimensional structure data optimum for the stringed instrument of the present invention by passing through the design in which the static structural analysis by the finite element method is repeated by the above-stated procedures.

It is possible to obtain values of the stress, the strain in addition to the displacement by each mesh node point as numeric data obtained by the static structural analysis by the finite element method. Distribution data of the stress by each mesh node point generated at each portion of the stringed instrument when it is tightened, obtained by using the static structural analysis by the finite element method are used as distribution data of initial stress when the later-described modal analysis by the finite element method and the frequency response analysis by the finite element method are performed. Namely, it is possible to analyze the vibrational characteristics of the stringed instrument of the present invention under the tightened state (loaded state) by using the finite element method.

Note that when the modal analysis by the finite element method and the frequency response analysis by the finite element method are performed, it is necessary to define the density of the material. The densities of the materials respectively applied by each portion of the instrument or by each part of the instrument of the mesh element model imported to the finite element method software are defined.

It is possible to obtain a resonance frequency (natural frequency) under a state considering (containing) the initial stress distribution obtained by the static structural analysis of the stringed instrument of the present invention by continuously performing the modal analysis by the finite element method if the finite element method is used though it is not particularly illustrated. Generally, it is performed as a matter of course to grasp the resonance frequency by the modal analysis and a posture of the vibrational mode at the time when every oscillators including the stringed instrument of the present invention is analyzed by the finite element method.

Figure 10:
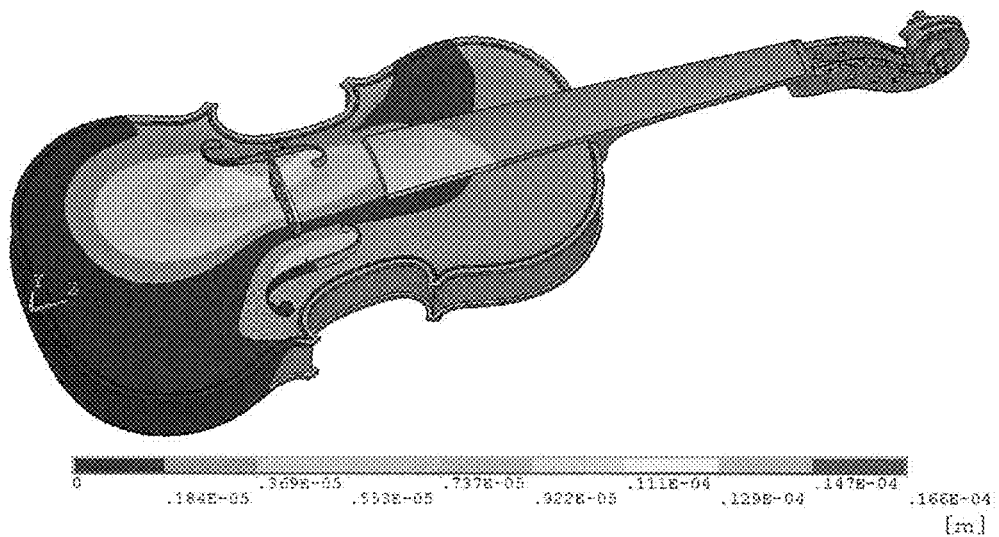
FIG. 10 is a gray scale representing a result of a distribution of a vibrational displacement among an instrument main body, a bridge, and a sound post (not-illustrated) by continuously performing a frequency response analysis under a state in which an initial stress distribution of the stringed instrument of the present invention is considered (contained)

FIG. 10 is a gray scale representing a result of a distribution of a vibrational displacement among the instrument main body, the bridge, and the sound post (not-illustrated) by continuously performing the frequency response analysis under a state in which the initial stress distribution of the stringed instrument of the present invention is considered (contained). The gray scale in FIG. 10 visually illustrates a distribution of x'y'z' synthetic in displacement among the instrument main body, the bridge, and the sound post (not-illustrated) by changing colors thereof, in which the distribution is obtained by performing the frequency response analysis (660 Hz, generally assuming at the time of E-string open performance) by the finite element method under a state considering (containing) the distribution of the initial stress obtained as a result after the static structural analysis by the finite element method of the stringed instrument of the present invention described by using FIG. 9 is performed, and further, vibrational energy is assumed to be generated at an end portion of the bridge in the y' direction by rubbing the strings with a bow assuming an actual performance. As illustrated in FIG. 10, it is possible to visually understand, for example, a degree of the vibration of the top plate portion of the stringed instrument of the present invention, and so on at the design time by using the frequency response analysis by the finite element method. The frequency response analysis by the finite element method is useful when right or wrong (OK or NG) of the design of the stringed instrument of the present invention is judged, and when a design principle is determined. Namely, the frequency response analysis by the finite element method as stated above is very convenient and useful to design the stringed instrument of the present invention in detail because it is possible to numerically obtain the distributions of the displacement, the stress, and the strain of each portion of the instrument main body when the actual performance is generally assumed.

Figure 11:
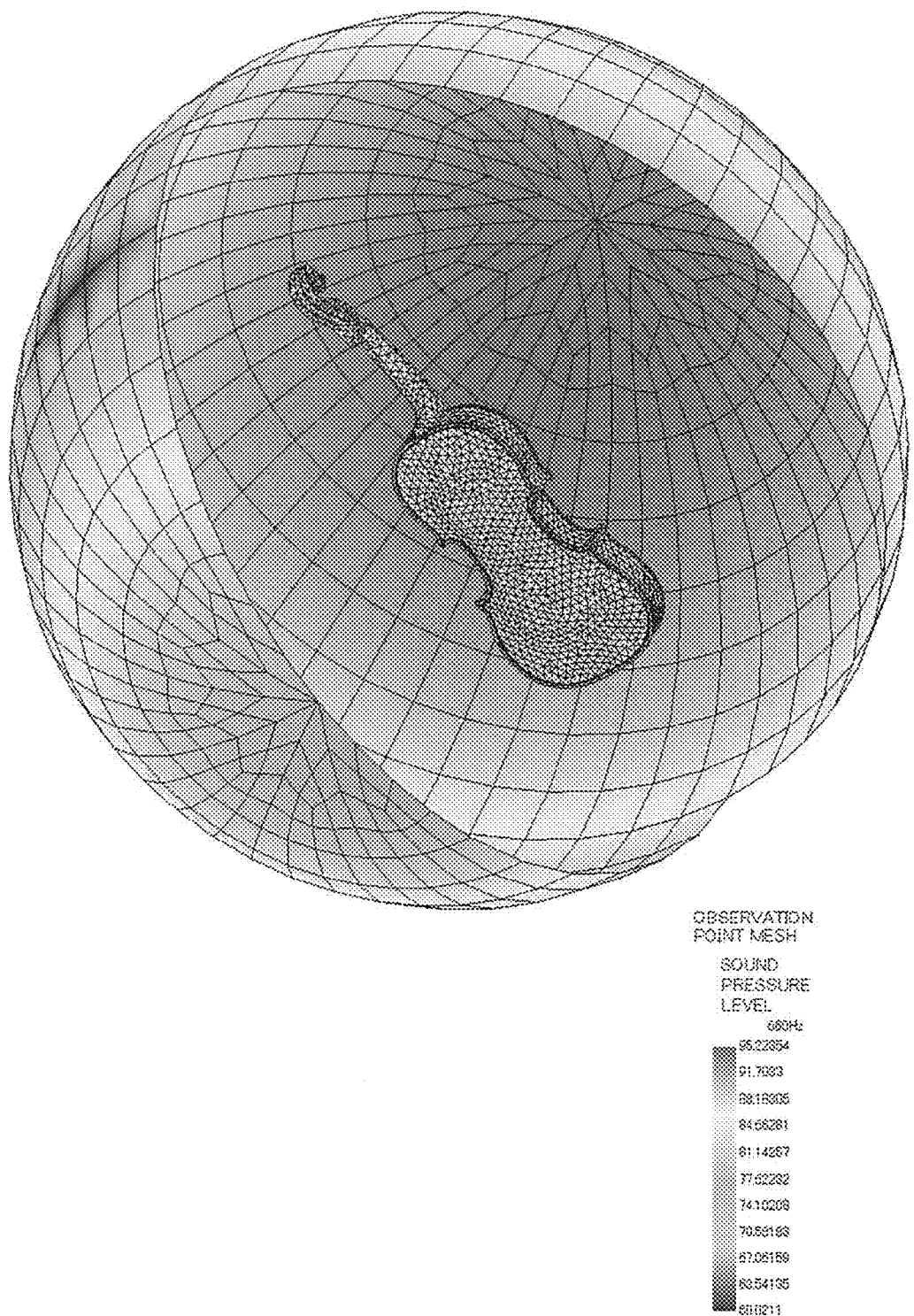
FIG. 11 is a gray scale representing a result in which a distribution of displacement by each mesh node point among the instrument main body, the bridge, and the sound post (not-illustrated) obtained as a result after the frequency response analysis by the finite element method described by using

FIG. 11 is a gray scale representing a result in which the distribution of the displacement by each mesh node point among the instrument main body, the bridge, the sound post (not-illustrated) obtained as a result after the frequency response analysis by the finite element method described by using FIG. 10 is performed and a boundary element are imported, and an acoustic analysis by means of the fast multipole boundary element method (FMBEM) is performed.

It is possible to perform the acoustic analysis by using the distribution of the displacement (or speed, or acceleration) of each portion by each mesh node point of the stringed instrument of the present invention obtained by using the frequency response analysis by the finite element method if an analysis software containing the boundary element method including the fast multipole boundary element method is used. If the acoustic analysis is performed by using a boundary element method software for acoustic analysis containing a fast multipole boundary element method solver capable of performing a large scale acoustic analysis, as illustrated in FIG. 11, a distribution of a sound pressure level (dB value) at an observation point group set in, for example, a spherical surface is represented as a gray scale. It is thereby possible to analyze and evaluate the performance relating to the sound volume of the stringed instrument of the present invention, and to obtain numeric data as a matter of course. If the boundary element method software for acoustic analysis is used, it is possible to compare and analyze a relative performance difference of an instrument resulting from the difference in the angles $\phi$, $\theta$, $\omega$ even if, for example, the instrument main body of the stringed instrument of the present invention is manufactured from the same three-dimensional structure model data. Besides, it is also possible to analyze the relative performance difference relating to the sound volume when the stringed instruments are manufactured by using a single kind and plural kinds of laser irradiation conditions. If the boundary element method software for acoustic analysis is used, it is possible to perform the acoustic analysis of the stringed instrument of the present invention in various modes such that a size value of each part of the three-dimensional structure model data is changed, and a new three-dimensional structure is added, and it is very convenient and useful to design the stringed instrument of the present invention in detail. For example, when WAON (trademark) is used as the boundary element method software for acoustic analysis, it is possible to analyze the sound pressure, acoustic intensity, and sound particle velocity relating to the sound emitted from the stringed instrument of the present invention.

Hereinafter, a flow including a design system and a manufacturing system of the stringed instrument of the present invention capable of constructing by using software useful for the design of the stringed instrument of the present invention described by using FIGS. 9, 10, 11 is described.

Figure 12:
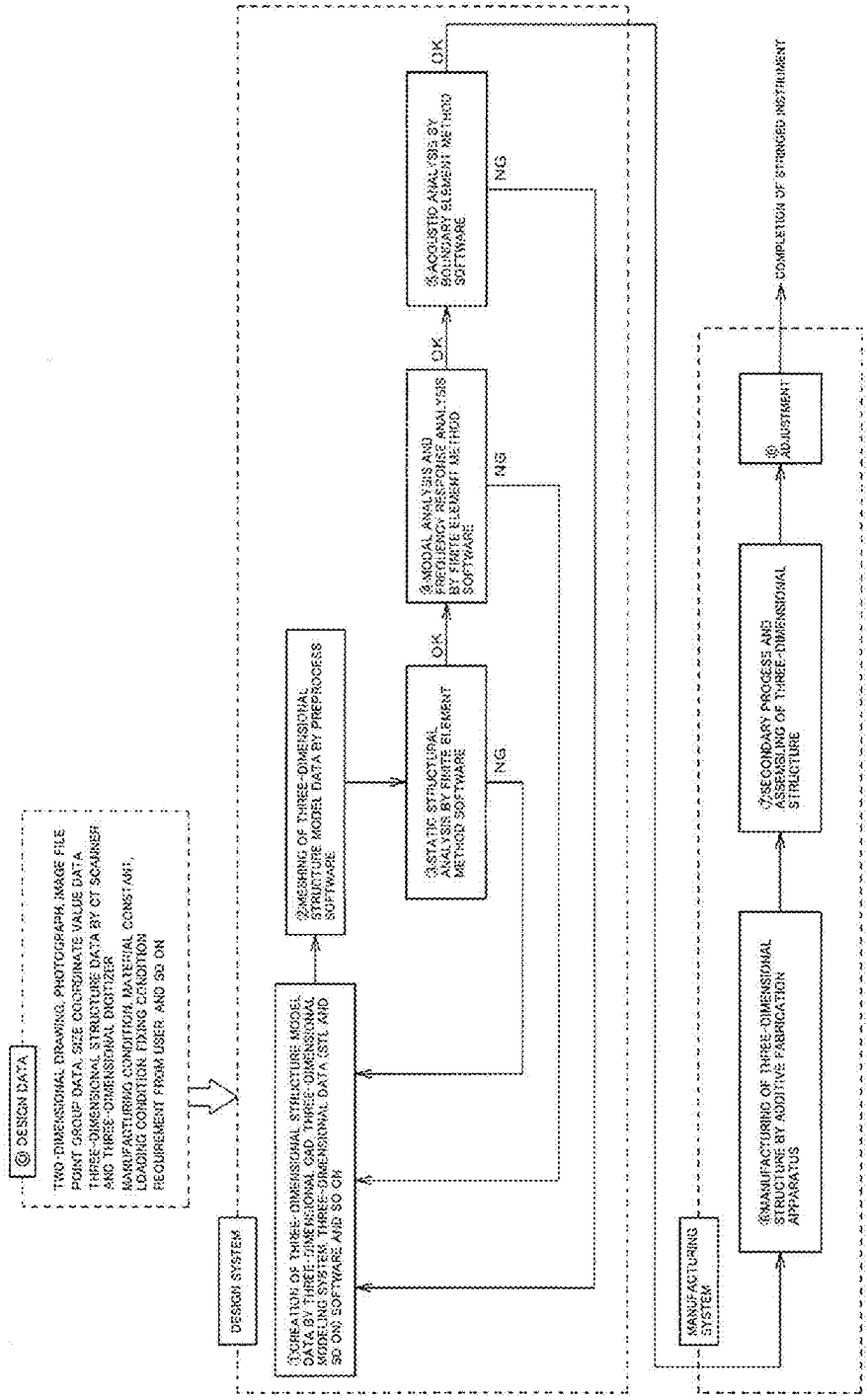
FIG. 12 is an explanatory view illustrating a basis of a design system and a manufacturing system of the stringed instrument manufactured by using the additive fabrication method including the stringed instrument of the present invention.

FIG. 12 is an explanatory view illustrating a basis of the design system and the manufacturing system of the stringed instrument manufactured by using the additive fabrication method including the stringed instrument of the present invention. In the present invention, the design and the manufacturing of the stringed instrument manufactured by using the additive fabrication method are performed in accordance with flowcharts divided into the design system and the manufacturing system illustrated in FIG. 12. A study including accumulation of data, the design, and the manufacturing are performed stably and efficiently, and thereby, it is possible to establish a system to provide fine stringed instruments desired by the user and so on.

Examples of software installed to the design system of the present invention illustrated in FIG. 12 are represented in Table 2. All of the software represented in the table 2 operate in a personal computer of which operating system is, for example, Microsoft Windows (trademark) XP, and therefore, the design system of the stringed instrument of the present invention can be consolidated.

(Secondary Effect Owing to Design Method of Stringed Instrument)

As stated above, it is possible to obtain approximate the same three-dimensional structures by using the additive fabrication method, and therefore, it is possible to obtain a new stringed instrument of the present invention which is almost the same as the stringed instrument of the present invention before it is broken when, for example, the stringed instrument of the present invention is unrecoverbly broken caused by an unforeseen drop impact accident or the like by a user and so on if the three-dimensional structure data and the manufacturing condition input to the additive fabrication apparatus are recorded to be stored in recording media such as a magnetic disk, and optical disk for data storage, and recording devices such as a flash memory, a hard disk, and the stringed instrument of the present invention is newly manufactured by the additive fabrication method by using the recorded and stored three-dimensional structure data and the manufacturing condition.

Further, it goes without saying that variation of adjustment of the performances of the stringed instrument of the present invention is further diversified if the raw material of the stringed instrument of the present invention is selected from, for example, synthetic resin powder in which glass bead or metal powder are mixed, and a heat plasticity material powder such as metal because the material constants (elastic constant, density, and so on) of the fabricated three-dimensional structure are diversified.

The present invention described hereinabove relates to the violin family being the stringed instruments, but it is possible to similarly manufacture stringed instruments including a shape similar to the violin family and a function of an instrument (It means stringed instruments belonging to lute family.

TABLE 2

| KIND OF SOFTWARE | NAME OF SOFTWARE (TRADEMARK) | NAME OF MAKER | NATIONALITY OF MAKER | USAGE (NOTE 4) |
| --- | --- | --- | --- | --- |
| THREE-DIMENSIONAL CAD | SolidWorks | SolidWorks Corporation | UNITED STATES | ① |
| THREE-DIMENSIONAL MODELING SYSTEM | FreeForm Modeling | SensAble Technologies | UNITED STATES | ① |
| THREE-DIMENSIONAL DATA (STL AND SO ON) EDIT SOFTWARE | Magics | Materialise | BELGIUM | ① |
| PREPROCESS SOFTWARE | TSV-PRE | TechnoStar | JAPAN | ② |
| FINITE ELEMENT METHOD SOFTWARE | ANSYS | ANSYS Inc. | UNITED STATES | ③④ |
| BOUNDARY ELEMENT METHOD SOFTWARE (FOR ACOUSTIC ANALYSIS) | WAON | Cybernet System | JAPAN | ⑤ |
| SPREADSHEET SOFTWARE | Excel | Microsoft | UNITED STATES | ①③④⑤ |

(NOTE 4) Usage corresponds to the number in the design system illustrated in FIG. 12.

Note that the plural software represented in the table 2 are not universal software in the design system of the stringed instrument of the present invention. Namely, it goes without saying that the design system of the stringed instrument of the present invention is continue to be updated to an effective design system by a version up of software, an installation of new software, and replacement and a simultaneous use according to the installation of the new software, further, an improvement of a system in itself, and so on.

Similarly, it goes without saying that the manufacturing system is also continue to be updated to further effective and efficient manufacturing system by installation of a new manufacturing method, process method, and apparatus, replacement, an simultaneous use, an improvement, and so on according to the installation.

For example, lute, guitar, mandolin, ukulele, banjo, matouqin, samisen, jamisen, Chinese fiddle, erh hu, Japanese lute, balalaika, arpeggione, viola da braccio, viola d'amore, viola da gamba, sitar, vina, rebab, sarangi, oud, and so on. The violin family belongs to the lute family.) by using the additive fabrication method.

It is said that a violin is invented in the 16th century. After that, it is completed to be a current shape in a period when Antonio Stradivari and Guarneri del Gesù being famous manufacturers lived, and some of the wooden violin family manufactured by the famous manufacturers like them at this period are taken over to today as famous instruments while receiving the best maintenance. Besides, these famous instruments are examples for imitation for current instrument manufacturers. The violin family is firmly fixed to human society as a culture, and accumulates the history for several hundred years. However, the famous instruments accumulating several hundred years history are very precious and expensive because the number of individuals is very few, but aging thereof are in progress even now, so it is said that a lifetime as an instrument of them may come close.

At present, it is possible to gather a detailed shape data of these famous instruments by using a non-contact type shape measuring apparatus (nondestructive inspector) such as a CT scanner, a three-dimensional digitizer, or the like before the lifetimes of these famous instruments as the instruments come, and to bring down as information useful for manufacturing the instruments in future.

When the stringed instrument of the present invention is manufactured by the additive fabrication method, the STL data of the three-dimensional structure is necessary. It is general to use the three-dimensional CAD, the three-dimensional modeling system, and so on as a method to create the STL data. In addition, it is possible to create the STL data based on the shape data obtained by using the above-stated non-contact type shape measuring apparatus such as the CT scanner, the three-dimensional digitizer.

As one of useful usage method of the additive fabrication method, the shape data of the famous instrument of the violin family is gathered by the above-stated non-contact type shape measuring apparatus, the STL data is created from this shape data, and further, it is possible to create a delicate shape copy by using this STL data by the additive fabrication method.

Incidentally, there is often the case that the material constants (elastic constant, density, and so on) are deferent between the wood used when the conventional wooden violin family is manufactured and, for example, the three-dimensional structure by the additive fabrication method forming the three-dimensional structure by selectively sintering the powder being the raw material which can be applied in the present invention. It is therefore impossible to completely reproduce the performances (sound volume, acoustic quality, and acousmato) of the instrument and the operability even if an outer shape of the famous instrument can be almost completely reproduced by using the additive fabrication method. However, a study is carried on by using the shape data of the famous instrument obtained by the non-contact type shape measuring apparatus as a base, and a design is performed by compositely using various design items including the manufacturing methods illustrated in the present invention, then it becomes possible to approximate the performances of the stringed instruments manufactured by the additive fabrication method including the stringed instruments of the present invention to the performances of the famous instruments.

Besides, plenty of whole models, partial models, and cut models of the shape copy of the precious famous instruments are prepared by using the additive fabrication method for the current instrument manufacturers, and these models are provided as reference data when a new wooden violin family is manufactured, and thereby, it is possible to support the manufacturing of a fine wooden violin family.

Hereinabove, the embodiments of the present invention are described, but the present invention is not limited to the described embodiments, and various changes, modification, and combination which come within the meaning and range of equivalency of the claims are therefore intended to be embraced therein. For example, the additive fabrication method forming the three-dimensional structure by solidifying the raw material powder by means of laser sintering and the additive fabrication method forming the three-dimensional structure by solidifying the liquid state raw material by means of light irradiation, and the fabrication method forming the three-dimensional structure by combining the above are exemplified as the concrete methods integrally forming the desired three-dimensional structure while changing the material constants of the desired area and the adjacent area in the above-stated embodiments. However, the concrete methods according to the present invention are not limited to only the above-stated methods.

What is claimed is:

1. A stringed instrument, comprising:
   a) a resonance box portion being fabricated by an additive fabrication method of sintering synthetic resin powder by light irradiation and being configured in a single layer; and
   b) a neck portion protruding from said resonance box portion,
   wherein material constants at a three-dimensional desired area of said resonance box portion are different from material constants at a three-dimensional area adjacent to the desired area step by step or continuously, and the difference between the material constants is due to changing irradiation conditions of light for each area respectively, said neck portion or said resonance box portion or both are constituted by including an outside contour portion fabricated by sintering and a space portion surrounded by the outside contour portion; at least one discharge hole to discharge unsintered synthetic resin powder, which remained inside the space portion is provided at the outside contour portion, and the at least one discharge hole, after the unsintered synthetic resin powder is discharged, maintains an open state or is closed by a closing member.

2. The stringed instrument according to claim 1, wherein said resonance box portion is constituted by including a top plate portion, a back plate portion, and side plate portions positioning between the top plate portion and the back plate portion, and the desired area is at least provided at the top plate portion or the back plate portion.

3. The stringed instrument according to claim 1, wherein said neck portion is integrally fabricated with said resonance box portion by the additive fabrication method.

4. The stringed instrument according to claim 3, wherein said neck portion is reinforced by a reinforcing member along a longitudinal direction at inside or outside thereof.

5. The stringed instrument according to claim 1, wherein said neck portion is fabricated separately from said resonance box portion by the additive fabrication method, and attached to said resonance box portion via a combined portion.

6. The stringed instrument according to claim 1, wherein said neck portion or said resonance box portion or both are constituted by including an outside contour portion fabricated by sintering and an enclosed space portion enclosed by the outside contour portion, and unsintered synthetic resin powder is remained inside the enclosed space portion.

7. The stringed instrument according to claim 1, wherein the additive fabrication method is the one solidifying liquid state raw material by light irradiation.

8. The stringed instrument according to claim 7, wherein said neck portion or said resonance box portion or both are constituted by including an outside contour portion fabricated by solidification and an enclosed space portion enclosed by the outside contour portion, and a support fabricated by solidification in parallel with the outside contour portion to support the solidification fabrication when the outside contour portion is fabricated by solidification which remained inside the enclosed space portion.

9. The stringed instrument according to claim 7,
wherein said neck portion or said resonance box portion or both are constituted by including an outside contour portion fabricated by solidification and a space portion surrounded by the outside contour portion,
at least one discharge hole to discharge a support to support the solidification fabrication of the outside contour portion which remained inside the space portion is provided at the outside contour portion, and
the discharge hole after the support is discharged, maintains an open state or is closed by a closing member.

10. A manufacturing method of a stringed instrument, including a resonance box portion integrally fabricated by an additive fabrication method of sintering synthetic resin powder by light irradiation and being configured in a single layer and a neck portion protruding from the resonance box portion, comprising:
 a) a resonance box portion fabrication process fabricating the resonance box portion while making material constants at a three-dimensional desired area different from material constants at a three-dimensional area adjacent to the desired area step by step or continuously, by changing the irradiation conditions of light for each area respectively in order to generate a difference between the material constants;
 b) a neck portion manufacturing process manufacturing the neck portion in parallel with or before or after said resonance box portion fabrication process; and
 c) a neck portion attaching process attaching the neck portion to the resonance box portion fabricated at said resonance box fabrication process,
 wherein the neck portion or the resonance box portion or both are fabricated by being separated into an outside contour portion fabricated by sintering and a space portion surrounded by the outside contour portion, at least one discharge hole to discharge unsintered synthetic resin powder, which remained inside the space portion is provided at the outside contour portion, and the at least one discharge hole, after the unsintered synthetic resin powder is discharged, maintains an open state or is closed by a closing member.

11. The manufacturing method of the stringed instrument according to claim 10, wherein the neck portion is fabricated by the additive fabrication method.

12. The manufacturing method of the stringed instrument according to claim 10, wherein the neck portion or the resonance box portion or both are fabricated by being separated into an outside contour portion fabricated by sintering and an enclosed space portion enclosed by the outside contour portion, and unsintered synthetic resin powder, which is remained inside the enclosed space portion.

13. The manufacturing method of the stringed instrument according to claim 10, wherein the additive fabrication method is the one solidifying liquid state raw material by light irradiation, and the difference of the material constants is generated by a condition change control of general mixture ratio of plural liquid state raw materials.

14. The manufacturing method of the stringed instrument according to claim 13, wherein the neck portion or the resonance box portion or both are fabricated by being separated into an outside contour portion fabricated by solidification and an enclosed space portion enclosed by the outside contour portion, and a support fabricated by solidification in parallel with the outside contour portion to support the solidification fabrication when the outside contour portion is fabricated by solidification which remained inside the enclosed space portion.

15. The manufacturing method of the stringed instrument according to claim 13, wherein the neck portion or the resonance box portion or both are fabricated by being separated into an outside contour portion fabricated by solidification and a space portion surrounded by the outside contour portion, at least one discharge hole to discharge a support to support the solidification fabrication of the outside contour portion which remained inside the space portion is provided at the outside contour portion, and the discharge hole after the support is discharged, maintains an open state or is closed by a closing member.

16. A stringed instrument manufacturing apparatus for performing the manufacturing method of the stringed instrument according to claim 10.

17. A stringed instrument, comprising:
 a) a resonance box portion being fabricated by an additive fabrication method sintering powder by light irradiation;
 b) a neck portion protruding from said resonance box portion;
 c) material constants at a three-dimensional desired area of said resonance box portion being different from material constants at a three-dimensional area adjacent to the desired area step by step or continuously, by changing irradiation conditions of light for each area respectively in order to generate a difference between the material constants;
 d) the neck portion or said resonance box portion or both being constituted by including an outside contour portion fabricated by sintering and a space portion surrounded by the outside contour portion;
 e) at least one discharge hole to discharge unsintered powder which remained inside the space portion being provided at the outside contour portion; and
 f) the discharge hole after the unsintered powder is discharged, maintaining an open state or being closed by a closing member.

18. The stringed instrument of claim 17, wherein the additive fabrication method uses synthetic resin powder as the powder.

19. A manufacturing method of a stringed instrument, including a resonance box portion integrally fabricated by an additive fabrication method of sintering powder by light irradiation and a neck portion protruding from the resonance box portion, comprising:
 a) a resonance box portion fabrication process fabricating the resonance box portion while making material constants at a three-dimensional desired area different from material constants at a three-dimensional area adjacent to the desired area step by step or continuously, by changing irradiation conditions of light for each area respectively in order to generate a difference between the material constants;
 b) a neck portion manufacturing process manufacturing the neck portion in parallel with or before or after said resonance box portion fabrication process;
 c) a neck portion attaching process attaching the neck portion to the resonance box portion fabricated at said resonance box fabrication process;
 d) the neck portion or the resonance box portion or both being fabricated by being separated into an outside contour portion fabricated by sintering and a space portion surrounded by the outside contour portion;

e) providing at least one discharge hole to discharge unsintered powder which remained inside the space portion at the outside contour portion; and
f) the discharge hole after the unsintered powder is discharged, maintaining an open state or being closed by a closing member.

20. The manufacturing method of claim 19, wherein the additive fabrication method uses synthetic resin powder as the powder.

* * * * *